(12) United States Patent
Ohno et al.

(10) Patent No.: US 8,657,060 B2
(45) Date of Patent: Feb. 25, 2014

(54) SUPPORT MOUNT BRACKET, METHOD FOR MOUNTING FRONT DIFFERENTIAL GEAR UNIT, AND ATTACHMENT STRUCTURE OF FRONT DIFFERENTIAL GEAR UNIT

(75) Inventors: Osami Ohno, Hiroshima (JP); Osamu Kurogi, Hiroshima (JP); Noritaka Sakiyama, Hiroshima (JP); Hiroyuki Akaki, Higashi-Hiroshima (JP); Hideto Yamada, Higashi-Hiroshima (JP); Osamu Kishi, Hiroshima (JP)

(73) Assignees: Ford Global Technologies, LLC, Dearborn, MI (US); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/636,622

(22) PCT Filed: Mar. 29, 2010

(86) PCT No.: PCT/JP2010/002281
§ 371 (c)(1),
(2), (4) Date: Nov. 8, 2012

(87) PCT Pub. No.: WO2011/121639
PCT Pub. Date: Oct. 6, 2011

(65) Prior Publication Data
US 2013/0127146 A1  May 23, 2013

(51) Int. Cl.
*B62D 21/03* (2006.01)
(52) U.S. Cl.
USPC .............................. 180/312; 280/781; 180/291

(58) Field of Classification Search
USPC ........... 180/312, 378, 291; 280/781, 795, 107
See application file for complete search history.

(56) References Cited

U.S. PATENT DOCUMENTS 4,263,980 A * 4/1981 Harlow et al. ................. 180/292
4,667,764 A * 5/1987 Sawada et al. ................ 180/297

(Continued)

FOREIGN PATENT DOCUMENTS

GB      2390581 B      6/2005
JP      59-067175 A    4/1984

(Continued)

OTHER PUBLICATIONS

International Search Report; PCT/JP2010/002281; Jun. 29, 2010.

*Primary Examiner* — Drew Brown
(74) *Attorney, Agent, or Firm* — Studebaker & Brackett PC

(57) ABSTRACT

A support mount bracket (57) provided on a vehicle frame (9) and configured to support a mount part (53) of a front differential gear unit (36) is arranged on part of a cross-member (12) connecting a pair of right and left main frames (10) so as to be, in a vehicle width direction, displaced from the center of a vehicle (1) in a width direction thereof. The support mount bracket (57) includes a base part (57d, 57e) to be connected to the cross-member (12), and a pair of fixing parts (57b, 57c) protruding from the base part (57d, 57c) and sandwiching the mount part (53) from sides thereof in the vehicle width direction. One (57b) of the fixing parts (57b, 57c) on a side closer to the center of the vehicle (1) in the width direction thereof is detachably attached to the base part (57d).

16 Claims, 32 Drawing Sheets

(56) References Cited

U.S. PATENT DOCUMENTS

| | | | |
|---|---|---|---|
| 4,856,751 A | 8/1989 | Ohba | |
| 7,296,650 B2 * | 11/2007 | Ohta et al. | 180/312 |
| 8,479,868 B2 * | 7/2013 | Wakatsuki et al. | 180/299 |
| 8,517,140 B2 * | 8/2013 | West et al. | 180/360 |
| 2008/0023240 A1 * | 1/2008 | Sunsdahl et al. | 180/68.2 |
| 2013/0008735 A1 * | 1/2013 | Hiramatsu et al. | 180/291 |

FOREIGN PATENT DOCUMENTS

| | | |
|---|---|---|
| JP | 62-052027 U | 3/1987 |
| JP | 63-184125 U | 11/1988 |
| JP | 01-278838 A | 11/1989 |
| JP | 2585913 Y2 | 9/1998 |
| WO | 2004/002808 A1 | 1/2007 |

* cited by examiner

SUPPORT MOUNT BRACKET, METHOD FOR MOUNTING FRONT DIFFERENTIAL GEAR UNIT, AND ATTACHMENT STRUCTURE OF FRONT DIFFERENTIAL GEAR UNIT

TECHNICAL FIELD

The present invention belongs to a technical field relating to a support mount bracket provided on a vehicle frame and configured to support a mount part of a front differential gear unit, to a method for mounting the front differential gear unit on the vehicle frame, and to an attachment structure of the front differential gear unit to the vehicle frame.

BACKGROUND ART

Conventionally, a ladder shaped chassis frame is provided in a small truck or a vehicle called a "sport-utility vehicle (SUV)" as described in, e.g., Patent Documents 1 and 2. The chassis frame is formed in the ladder shape by a pair of right and left main frames (also called "side frames") extending in a vehicle length direction (vehicle longitudinal direction) and a plurality of cross-members each connecting the main frames together.

Typically, in the foregoing vehicle, power of an engine arranged in an engine room positioned in a front part of the vehicle is transmitted to rear wheels through a transmission, a propeller shaft, and a rear differential gear unit. In the case of a four-wheel-drive vehicle (4WD vehicle), a power transfer unit is provided between the transmission and the propeller shaft, and output of the transmission is distributed to front and rear wheels through the power transfer unit.

In the foregoing 4WD vehicle, power is transmitted from the power transfer unit to the front wheels through a front wheel propeller shaft and a front differential gear unit. The front differential gear unit is attached to a front part of a chassis frame. In such a case, in order to reduce transmission of vibration of the front differential gear unit to the chassis frame, the front differential gear unit is elastically supported by the chassis frame through a plurality of mounts (typically three or four mounts) each including a cylindrical rubber bush and a central shaft penetrating the center (center hole) of the rubber bush. Each of the mounts is attached to a mount bracket provided on the chassis frame, and is supported by the mount bracket.

CITATION LIST

Patent Document

PATENT DOCUMENT 1: British Patent Publication No. 2390581

PATENT DOCUMENT 2: International Publication No. 2004/002808

SUMMARY OF THE INVENTION

Technical Problem

In the front part of the chassis frame attached to the front differential gear unit, a distance between right and left main frames is short, and two cross-members each configured to support an arm of a front wheel suspension device are provided. It is necessary to attach the front differential gear unit to the chassis frame within a small space surrounded by the main frames and the cross-members.

The present invention has been made in view of the foregoing, and it is an objective of the present invention to improve mountability of a front differential gear unit on a vehicle frame and facilitate attachment of the front differential gear unit within a small space.

Solution to the Problem

In order to accomplish the foregoing objective, the present invention is intended for a support mount bracket which is provided on a vehicle frame including a pair of right and left main frames extending in a vehicle length direction and a cross-member connecting the main frames, to support a mount part of a front differential gear unit, and which is arranged on part of the cross-member which is, in a vehicle width direction, displaced from a center of a vehicle in the vehicle width. The support mount bracket includes a base part to be connected to the cross-member; and a pair of fixing parts protruding from the base part and sandwiching the mount part from sides of the mount part in the vehicle width direction. One of the fixing parts on a side closer to the center of the vehicle in the vehicle width direction is detachably attached to the base part.

According to the foregoing configuration, in order to support the mount part of the front differential gear unit by the support mount bracket arranged on part of the cross-member which is, in the vehicle width direction, displaced from the center of the vehicle in the vehicle width direction (from a center axis line of the vehicle in the vehicle width direction), the front differential gear unit (mount part) may be, in the vehicle width direction, moved from the center of the vehicle in the vehicle width direction toward the support mount bracket in the state in which the one of the fixing parts on the side closer to the center of the vehicle in the vehicle width direction is detached from the base part, and then may come into contact with the other one of the fixing parts on a side farther from the center of the vehicle in the vehicle width direction. In such a state, the one of the fixing parts on the side closer to the center of the vehicle in the vehicle width direction may be attached to the base part. Thus, the mount part of the front differential gear unit may be attached to the support mount bracket through a relatively-large workspace on the side closer to the center of the vehicle in the vehicle width direction, thereby facilitating attachment of the front differential gear unit.

It is preferred for the support mount bracket that each of the fixing parts is a plate-shaped member, the base part includes an attachment part configured to detachably attach and fix a detachable fixing part and protruding from the cross-member toward the detachable fixing part, and a first hole into which a fixing part fastening bolt configured to fasten the detachable fixing part to the attachment part is inserted, and a second hole into which a mount part fastening bolt penetrating the mount part in parallel to the fixing part fastening bolt and configured to fasten the mount part to the fixing parts is inserted are formed in the detachable fixing part.

Since the detachable fixing part is fixed to the base part (attachment part) and also supports the mount part, the detachable fixing part can support the mount part with high stiffness. Since the fixing part fastening bolt configured to fasten the detachable fixing part to the base part is parallel to the mount part fastening bolt configured to fasten the mount part to the fixing parts, the foregoing fastening can be performed in one direction. Thus, workability is improved.

In the case where the base part includes the attachment part, it is preferred that one of the fixing parts on a side farther from the center of the vehicle in the vehicle width direction is integrally formed with the base part.

According to the foregoing, the one of the fixing parts on the side farther from the center of the vehicle in the vehicle width direction is not detachable from the base part, and, as a result, a step for attaching the one of the fixing parts on the side farther from the center of the vehicle in the vehicle width direction to the base part is not necessary.

In addition, in the case where the base part includes the attachment part, it is preferred that the fixing part fastening bolt stands on the attachment part so as to extend toward the center of the vehicle in the vehicle width direction, and a nut to be screwed onto the mount part fastening bolt is attached to one of the fixing parts on a side farther from the center of the vehicle in the vehicle width direction in a state in which rotation of the nut is stopped.

According to the foregoing, the detachable fixing part can be moved from the center of the vehicle in the vehicle width direction toward the fixing part fastening bolt, and then the fixing part fastening bolt can be inserted into the first hole of the detachable fixing part. Then, the nut can be screwed into the fixing part fastening bolt from the center of the vehicle in the vehicle width direction. Subsequently, the mount part fastening bolt is inserted onto the second hole from the center of the vehicle in the vehicle width direction, and penetrates the mount part. Then, the mount part fastening bolt is screwed into the nut prevented from rotating. As in the foregoing, the fastening of the fixing part fastening bolt and the mount part fastening bolt can be performed from the side closer to the center of the vehicle in the vehicle width direction, thereby improving the workability.

It is preferred that, in a tip end part of a protrusion of the attachment part, a recess is, as viewed in the vehicle width direction, formed to avoid an overlap with an outer shape of the mount part supported by the support mount bracket.

The recess prevents contact between the mount part and the tip end part of the protrusion of the attachment part when the mount part is moved toward the support mount bracket in the vehicle width direction, thereby facilitating such movement of the mount part.

In the case where the recess is formed, it is preferred that two fixing part fastening bolts stand apart from each other on the attachment part, and the recess is positioned between the two fixing part fastening bolts.

According to the foregoing, the recess can approach the cross-member to the maximum extent possible, and, as a result, the mount part can be attached to the support mount bracket in the state in which the mount part can approach the cross-member as much as possible. Thus, supportability of the mount part by the support mount bracket is improved.

In the support mount bracket, engine mount brackets protruding respectively from the main frames toward the center of the vehicle in the vehicle width direction may be provided at rear of the cross-member, part of the front differential gear unit may be positioned in a region surrounded by the engine mount brackets and the cross-member, the mount part may be provided in a front part of the front differential gear unit, and the support mount bracket may be provided in a rear part of the cross-member.

Even if part of the front differential gear unit is positioned in the region surrounded by the engine mount brackets and the cross-member, contact between the front differential gear unit and the engine mount brackets can be prevented. In addition, the mount part can be, in the vehicle width direction, moved from the center of the vehicle in the vehicle width direction toward the support mount bracket, and can approach the support mount bracket.

Another aspect of the present invention is intended for a method for mounting a front differential gear unit on a vehicle frame. The method includes moving the front differential gear unit such that a first mount part provided in a front part of the front differential gear unit is positioned closer to a center of a vehicle in a vehicle width direction relative to a first mount bracket provided in a position of the vehicle frame which is, in the vehicle width direction, displaced from the center of the vehicle in the vehicle width direction and configured to support the first mount; in a state in which the first mount is positioned closer to the center of the vehicle in the vehicle width direction relative to the first mount bracket, moving the front differential gear unit until the first mount part contacts a first fixing part provided in the first mount bracket; and supporting, by attaching a second fixing part to the first mount bracket, the first mount part contacting the first fixing part so as to sandwich the first mount part between the first and second fixing parts in the vehicle width direction.

According to the foregoing method, the first mount part of the front differential gear unit can be attached to the first mount bracket through a relatively-large workspace on a side closer to the center of the vehicle in the vehicle width direction, thereby facilitating attachment of the front differential gear unit.

The method further includes, after the supporting the first mount part so as to sandwich the first mount part between the first and second fixing parts in the vehicle width direction, supporting a second mount part provided at one end of the front differential gear unit in the vehicle width direction by a second mount bracket provided on the vehicle frame; and, after the supporting the second mount part by the second mount bracket, supporting a third mount part provided at the other end of the front differential gear unit in the vehicle width direction by a third mount bracket provided on the vehicle frame.

According to the foregoing, when the front differential gear unit is supported by the vehicle frame at three points, the entirety of the front differential gear unit can be supported with balance. That is, the front differential gear unit typically includes a gear accommodation part (accommodating a differential gear) having the largest weight. A most part of the weight of the front differential gear unit is supported by the first mount part and one of the second and third mounts, and the other mount (the second or third mount) functions to prevent the front differential gear unit from swinging about an axis extending in the longitudinal direction. Of the three mount parts, the first mount part which is highly important in terms of a support of the front differential gear unit and prevention of vibration is first attached to the first mount bracket. Thus, the first mount part can be attached to the first mount bracket in the state in which it is ensured that the first mount part is positioned relative to the first mount bracket, and the support of the front differential gear unit and the prevention of vibration can be ensured.

Still another aspect of the present invention is intended for an attachment structure of a front differential gear unit to a vehicle frame including a pair of right and left main frames extending in a vehicle length direction, and a cross-member connecting the main frames. The structure includes a first mount bracket attached to a vicinity of one of the main frames in a rear part of the cross-member and configured to support a first mount part provided in a front part of the front differential gear unit. The first mount bracket includes a base part connected to the cross-member, and a pair of fixing parts protruding from the base part and configured to support the mount part so as to sandwich the mount part from sides thereof in a vehicle width direction. One of the fixing parts on a side farther from the one of the main frames is detachably attached to the base part.

According to the foregoing structure, even in a small space surrounded by the right and left main frames and the cross-member, the first mount part of the front differential gear unit can be attached to the first mount bracket through a relatively-large workspace on a side closer to the center of the vehicle in the vehicle width direction, thereby facilitating attachment of the front differential gear unit.

It is preferred for the structure that each of the fixing parts is a plate-shaped member, the first mount part includes a cylindrical rubber bush and a central shaft penetrating a center part of the rubber bush, the rubber bush of the first mount part is sandwiched between the fixing parts, and the central shaft of the first mount part is fixed to the fixing parts in a state in which the central shaft penetrates the center part of the rubber bush in the vehicle width direction.

According to the foregoing, the first mount part can be attached to the first mount bracket in the state in which the first mount part is positioned relative to the first mount bracket in the vehicle width direction, the vehicle length direction, and the vertical direction. Thus, distortion of the rubber bush of the first mount part can be prevented (i.e., vibration can be effectively absorbed).

It is preferred that the base part of the first mount bracket includes an attachment part configured to detachably attach and fix a detachable fixing part and protruding from the cross-member toward the detachable fixing part.

According to the foregoing, the detachable fixing part can be easily attached to the base part (attachment part), and the first mount part can be easily attached to the first mount bracket.

It is preferred that one of the fixing parts on a side closer to the one of the main frames is integrally formed with the base part.

According to the foregoing, the one of the fixing parts on the side closer to the one of the main frames is not detachable from the base part, and, as a result, a step for attaching the one of the fixing parts on the side closer to the one of the main frames to the base part is not necessary.

For the structure in which second and third mount parts are provided respectively at ends of the front differential gear unit in the vehicle width direction, each of the first to third mount parts includes a cylindrical rubber bush and a central shaft penetrating a center part of the rubber bush, and the vehicle frame further includes, at rear of the cross-member, another cross-member connecting the main frames, it is preferred that the structure further includes a second mount bracket attached to the another cross-member in vicinity of other main frame and configured to support the second mount part; and a third mount bracket attached to the one of the main frames and configured to support the third mount part. In addition, it is preferred that the first mount part is attached to the first mount bracket such that the central shaft of the first mount part extends in the vehicle width direction, the second mount part is attached to the second mount bracket such that the central shaft of the second mount part extends in a vertical direction, and the third mount part is attached to the third mount bracket such that the central shaft of the third mount part extends in the vehicle length direction.

According to the foregoing, since the central shafts of the first to third mount parts extend in directions different from each other, vibration components generated in the front differential gear unit in any directions are less likely to be transmitted to the chassis frame. As described above, when the front differential gear unit is supported by the vehicle frame at three points, the entirety of the front differential gear unit can be supported with balance.

In the case where the front differential gear unit is supported by the vehicle frame at three points, it is preferred that the first mount part is attached to the first mount bracket in a state in which the first mount part is positioned relative to the first mount bracket in the vehicle width direction, the vehicle length direction, and the vertical direction.

According to the foregoing, when the front differential gear unit is attached to the vehicle frame, the entirety of the front differential gear unit can be substantially positioned in the vehicle width direction, the vehicle length direction, and the vertical direction only by initially attaching the first mount part to the first mount bracket. As a result, attachment of the second and third mount parts is facilitated. In addition, since the first mount part is attached to the first mount bracket in the state in which the first mount part is positioned relative to the first mount bracket, distortion of the rubber bush of the first mount part can be prevented, thereby effectively absorbing vibration.

In the case where the first mount part is positioned as described above, it is preferred that the rubber bush of the second mount part is mounted on an upper surface of the second mount bracket, the central shaft of the second mount part is fixed to the second mount bracket in a state in which the central shaft penetrates the center part of the rubber bush of the second mount part in the vertical direction, the central shaft of the third mount part penetrates the rubber bush of the third mount part in the vehicle length direction, and end parts of the central shaft protrude respectively toward front and rear sides of the rubber bush, and protruding end parts of the central shaft of the third mount part are fixed to the third mount bracket in a state in which the protruding end parts are mounted on an upper surface of the third mount bracket.

According to the foregoing, when the front differential gear unit is attached to the vehicle frame in the state in which the front differential gear unit is suspended by a suspending device, it is not necessary after the attachment of the first mount part to the first mount bracket that the front differential gear unit is suspended by the suspending device, and the front differential gear unit can be detached from the suspending device. As a result, it is not necessary to operate the suspending device in parallel with the attachment of the front differential gear unit, and therefore a single user can easily perform the attachment of the front differential gear unit.

Advantages of the Invention

As described above, according to the present invention, mountability of the front differential gear unit on the vehicle frame is improved, and the attachment of the front differential gear unit in a small space is facilitated.

DESCRIPTION OF EMBODIMENTS

An embodiment of the present invention will be described below in detail with reference to drawings.

Figure 1:
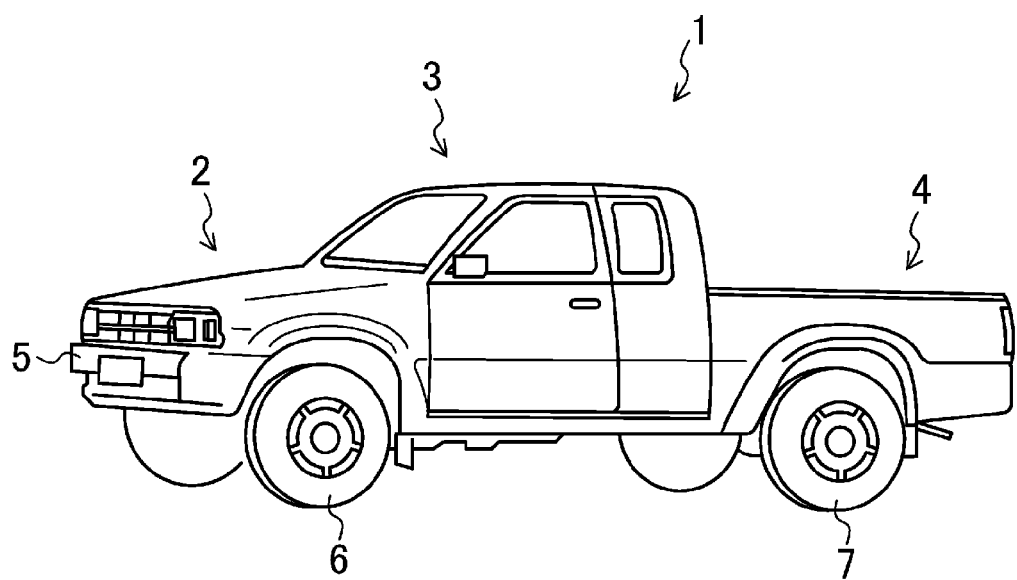
FIG. 1 is a perspective view illustrating the entirety of a vehicle for which a frontal collision energy absorption structure of an embodiment of the present invention is employed.
Figure 2:
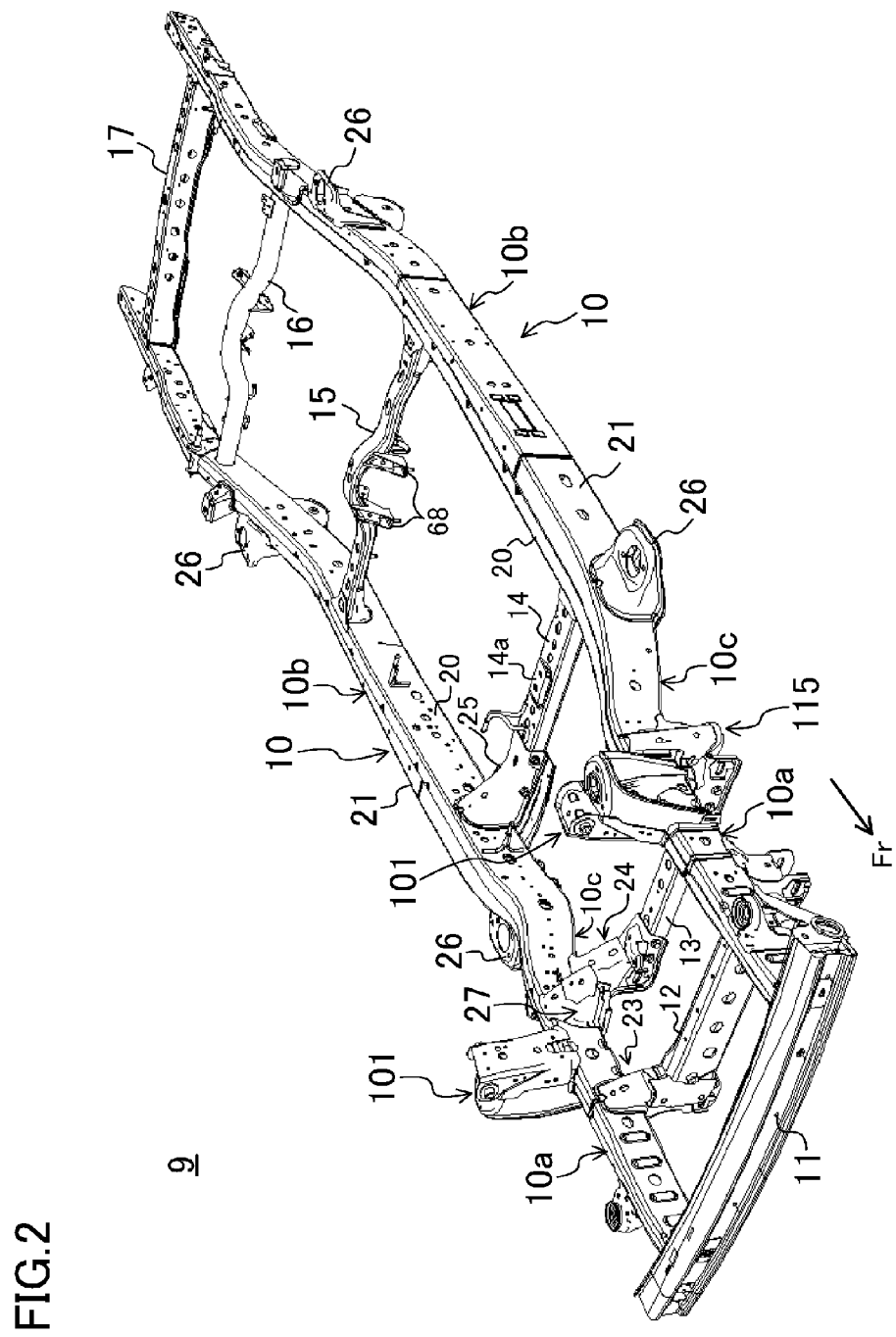
FIG. 2 is a perspective view of the entirety of a chassis frame of the vehicle diagonally from an upper left front side of the vehicle.
Figure 3:
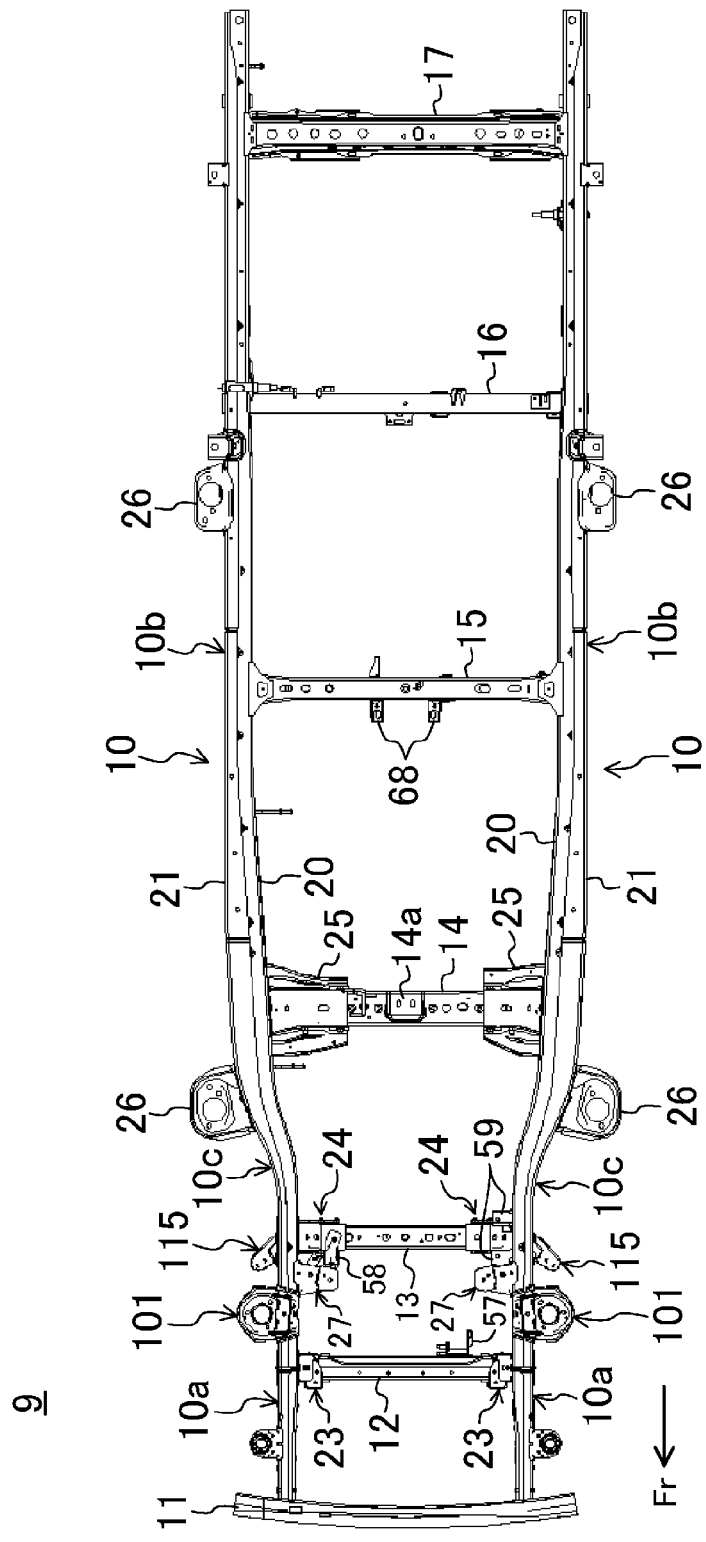
FIG. 3 is a plan view of the chassis frame.
Figure 4:
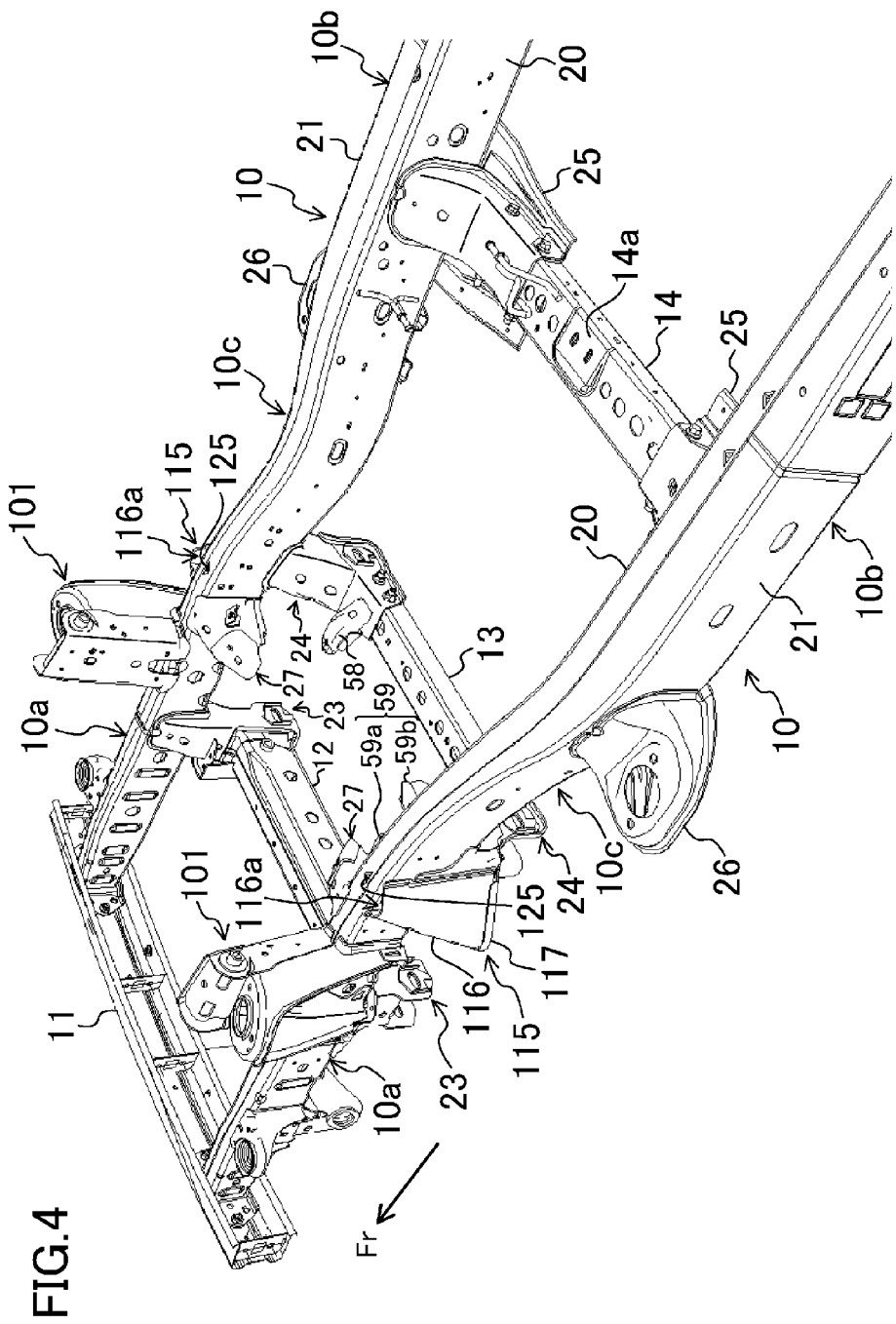
FIG. 4 is a perspective view of a front part of the chassis frame diagonally from an upper left rear side of the vehicle.
Figure 5:
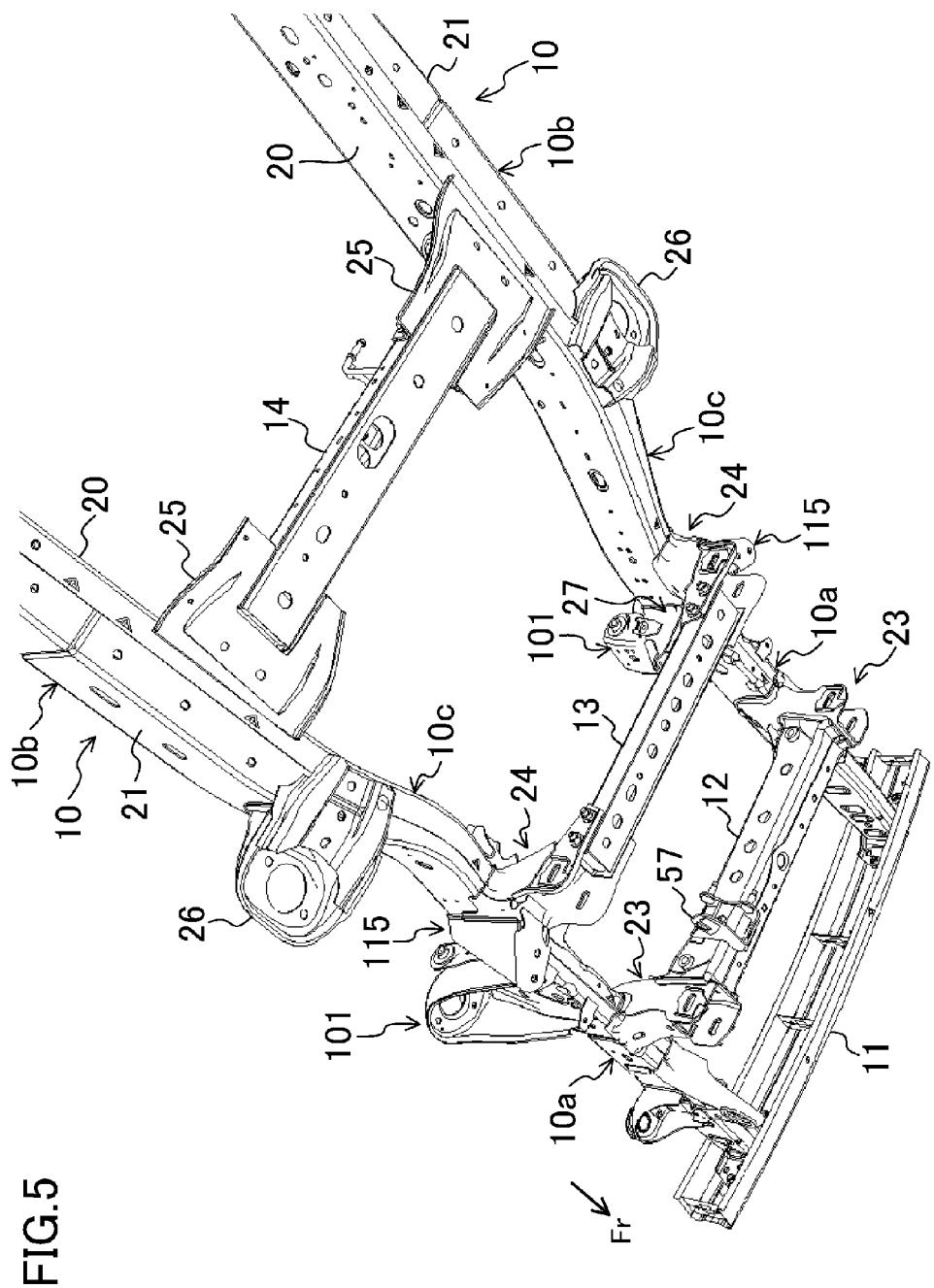
FIG. 5 is a perspective view of the front part of the chassis frame diagonally from a lower left rear side of the vehicle.
Figure 6:
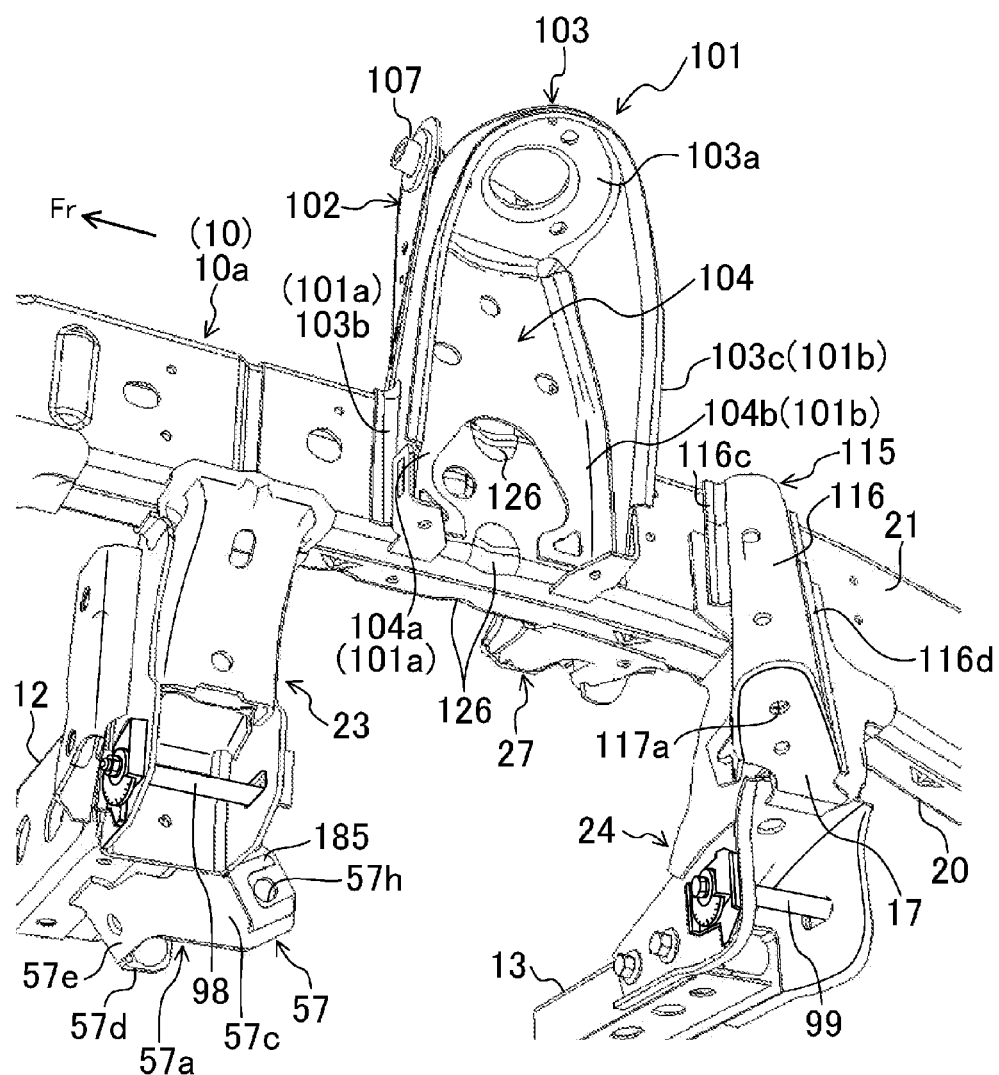
FIG. 6 is a perspective view illustrating the vicinity of a suspension tower in an outer part of a left main frame of the chassis frame in a vehicle width direction.
Figure 7:
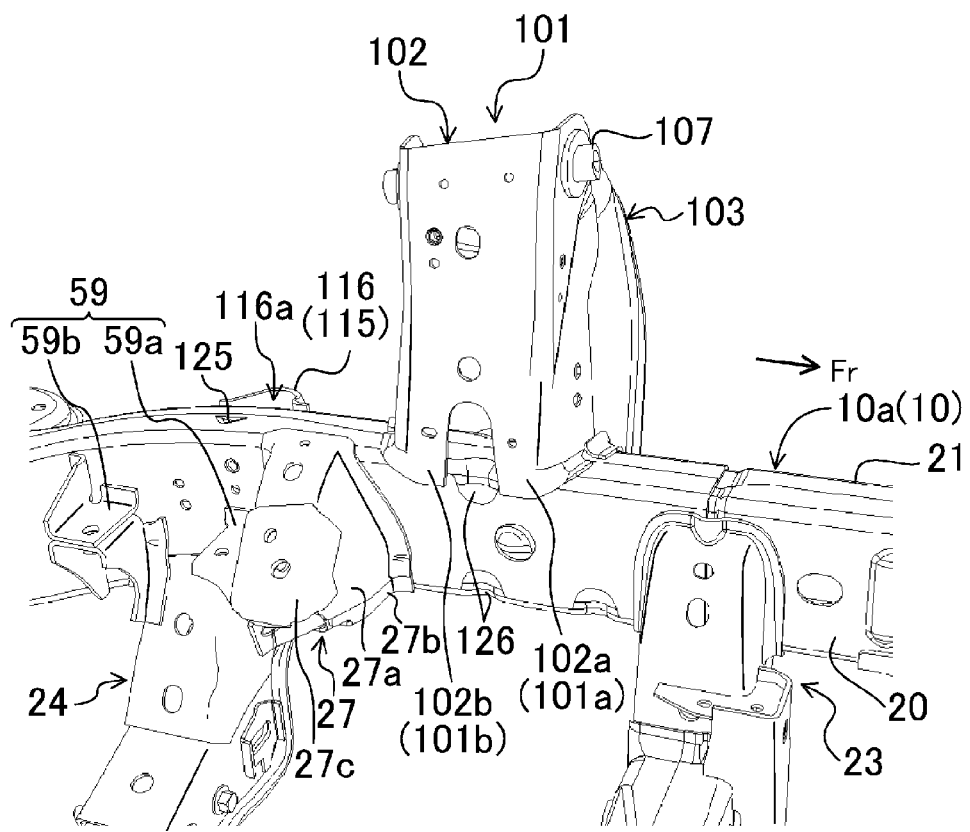
FIG. 7 is a perspective view illustrating the vicinity of the suspension tower in an inner part of the left main frame of the chassis frame in the vehicle width direction.
Figure 8:
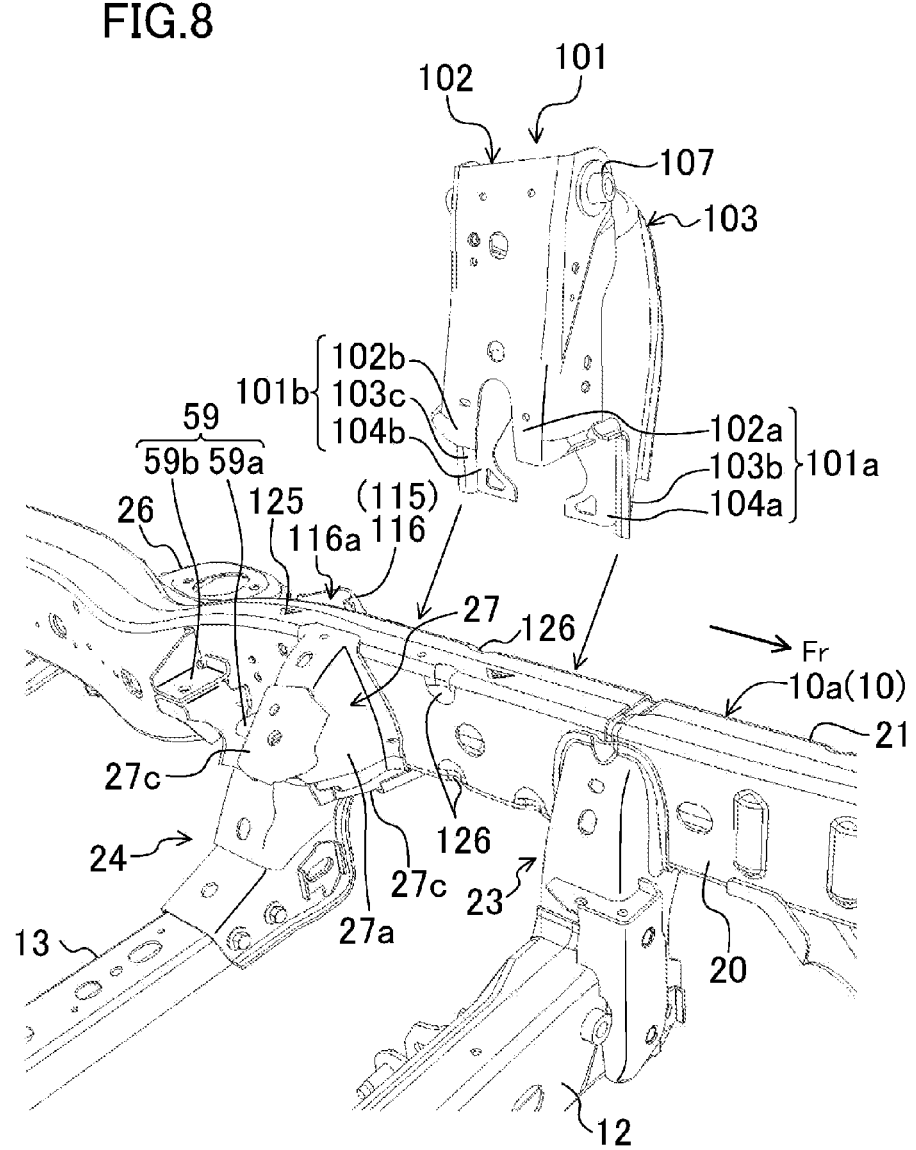
FIG. 8 is an exploded perspective view illustrating the vicinity of the suspension tower in the inner part of the left main frame of the chassis frame in the vehicle width direction.
Figure 9:
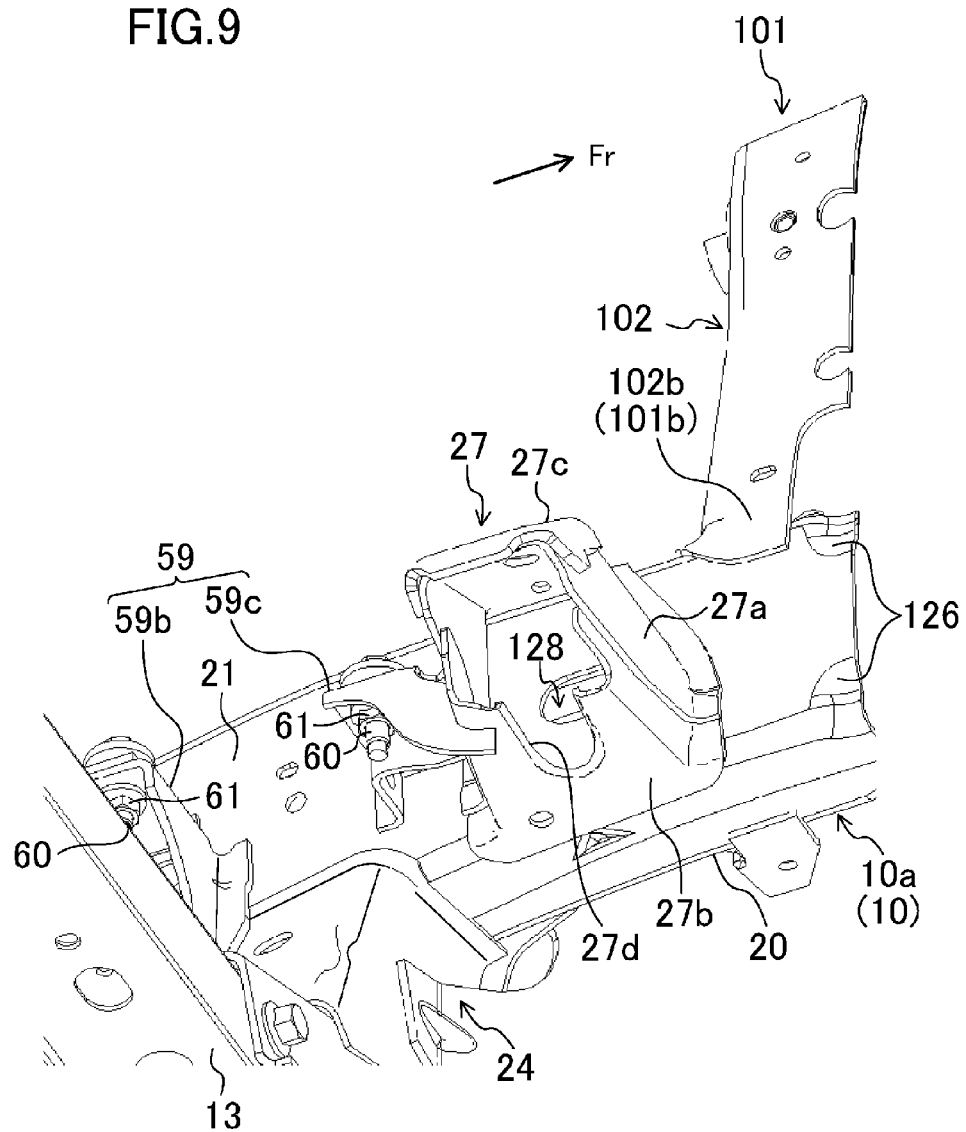
FIG. 9 is a perspective view illustrating the vicinity of an engine mount bracket in the inner part of the left main frame of the chassis frame in the vehicle width direction.
Figure 32:
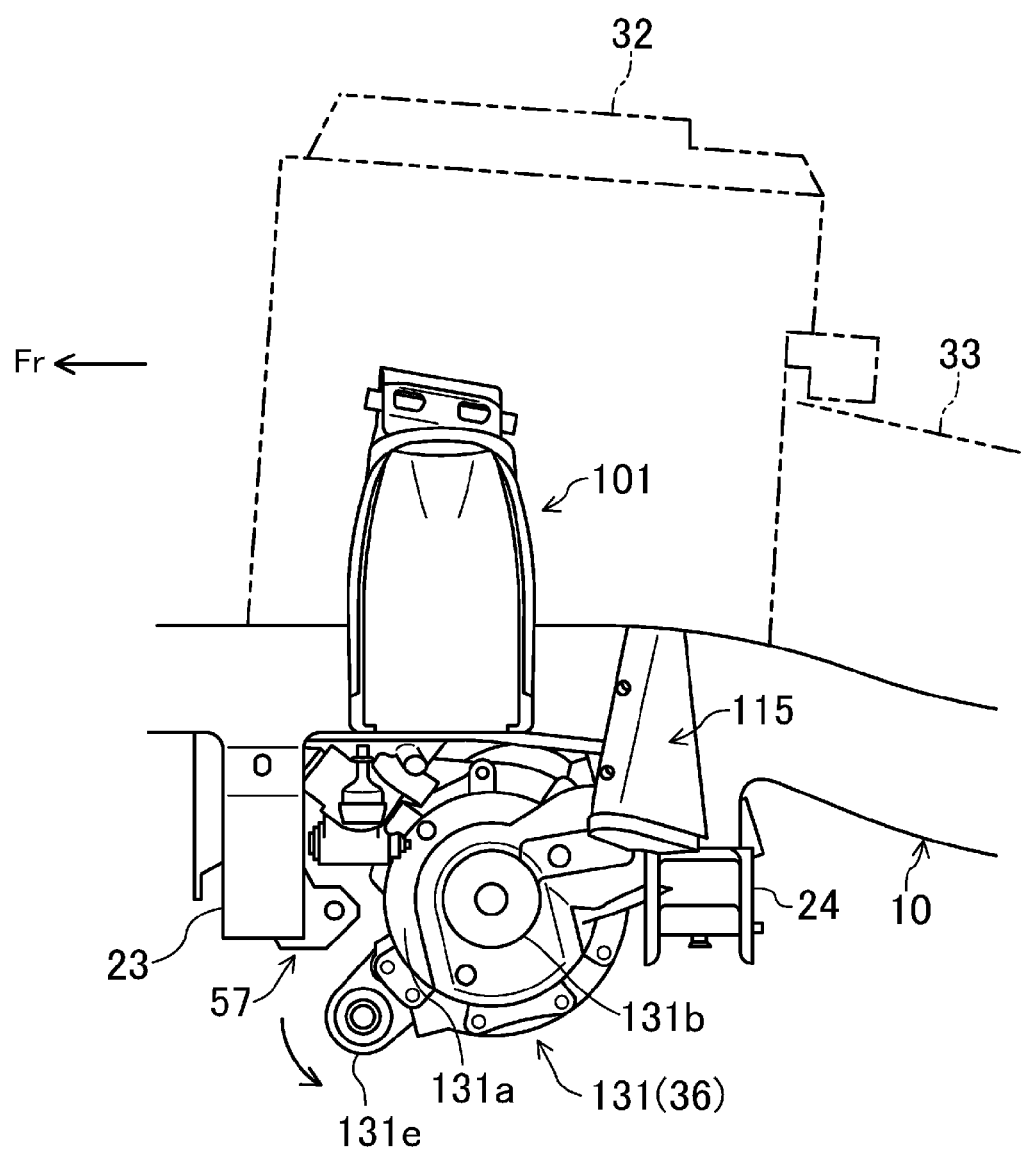
FIG. 32 is a side view illustrating a step for detaching the front differential gear unit upon a service.
Figure 33:
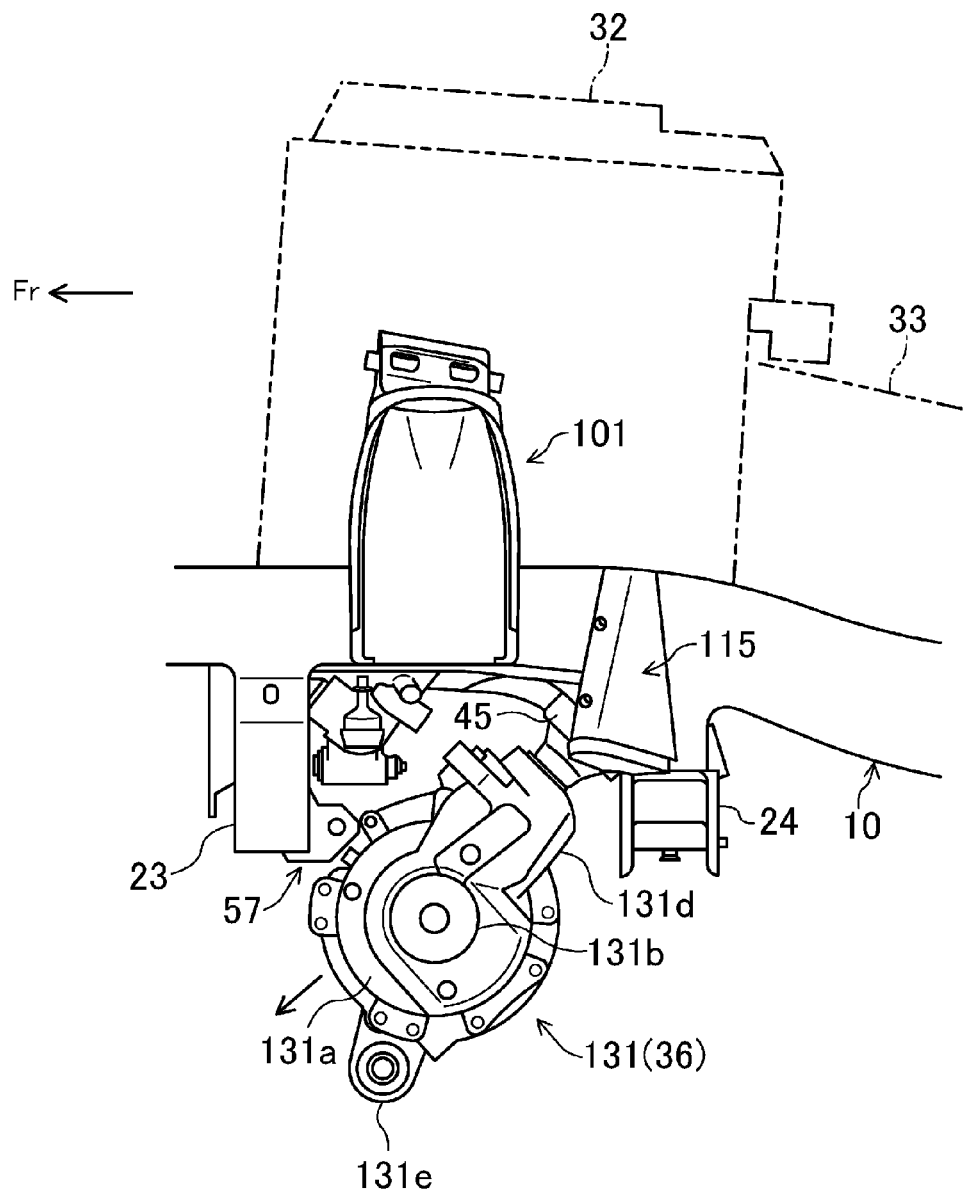
FIG. 33 is a side view illustrating another step for detaching the front differential gear unit upon the service.

FIG. 1 illustrates the entirety of a vehicle 1 (in the present embodiment, a small truck) for which a frontal collision energy absorption structure of the embodiment of the present invention is employed. FIGS. 2-12 illustrate the entirety or part of a chassis frame (vehicle frame) 9 of the vehicle 1, and FIGS. 13-24 illustrate the state in which various components (including units) are mounted on the chassis frame 9. Further, FIGS. 25-31 are views for describing a method for attaching a later-described front differential gear unit 36 to the chassis frame 9, and FIGS. 32 and 33 are views for describing a method for detaching the front differential gear unit upon a service.

Figure 13:
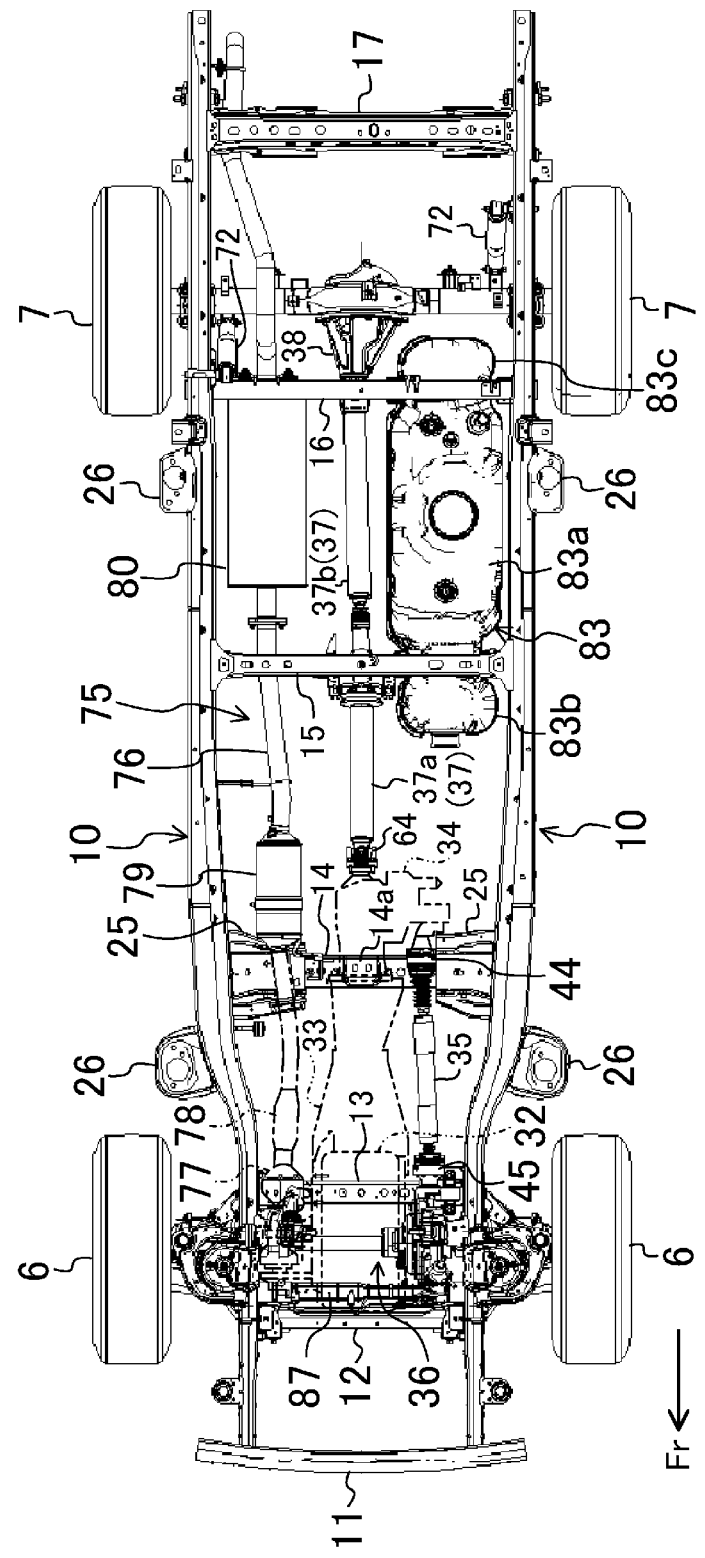
FIG. 13 is a plan view illustrating the state in which various components (including units) are mounted on the chassis frame.
Figure 14:
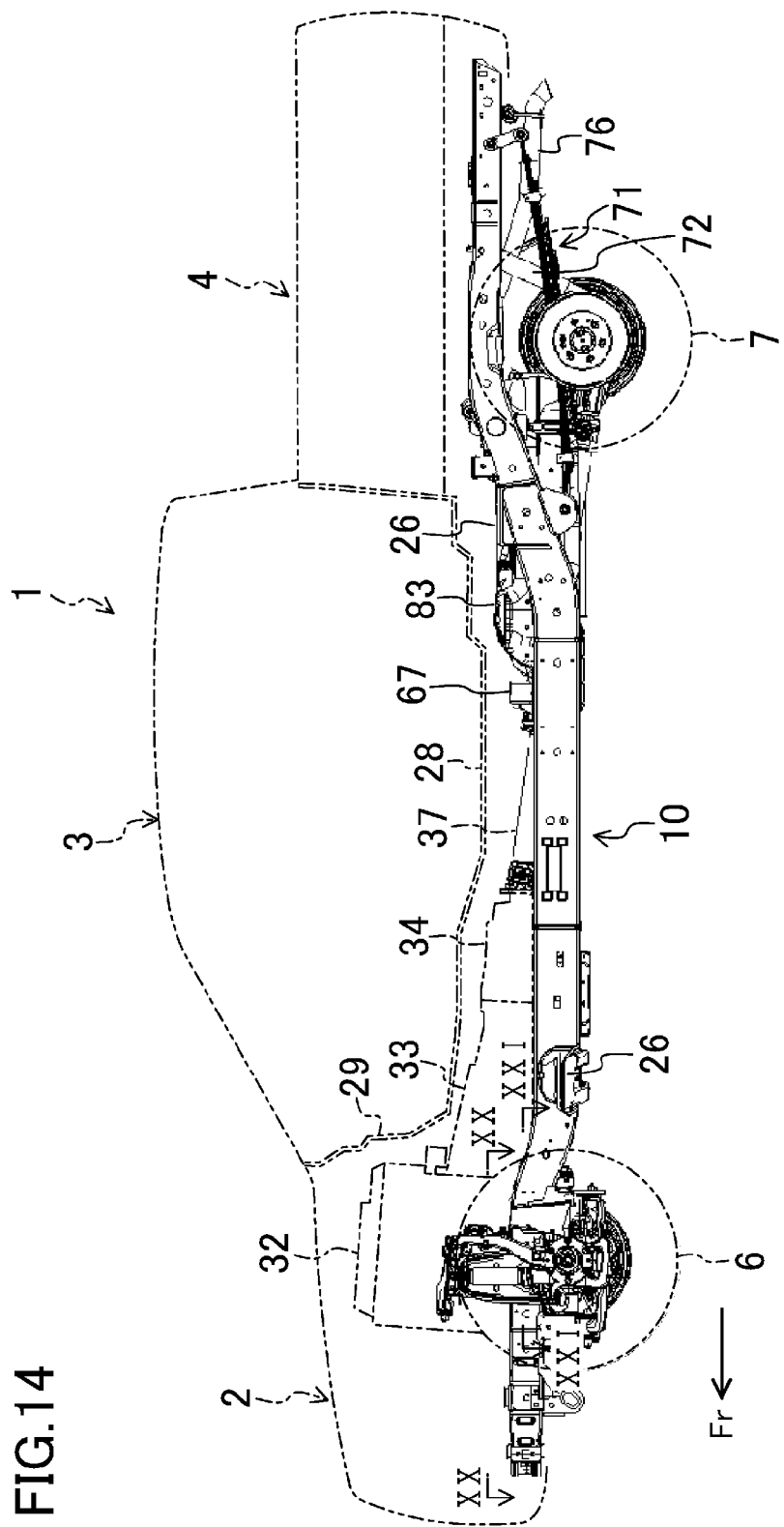
FIG. 14 is a side view of the component-mounted chassis frame from a left side of the vehicle.

Referring to FIGS. 1 and 14, the vehicle 1 includes, in this order from the front thereof, an engine room 2, a cabin 3, and a deck 4. The front, rear, left, and right of the vehicle 1 are hereinafter simply referred to as "front," "rear," "left," and "right." Note that, in FIGS. 2-18, 20-22, and 24-33, the front side of the vehicle 1 is represented by "Fr."

The vehicle 1 includes the chassis frame 9 in a lower part thereof. The chassis frame 9 includes a pair of right and left main frames (also called side frames) 10 extending in a vehicle length direction (longitudinal direction), and a plurality of cross-members (in the present embodiment, first to seventh cross-members 11-17 are provided in this order from the front) each connecting the main frames 10 together and extending in a vehicle width direction. The chassis frame 9 is in a ladder shape as viewed in the plane. Each of the main frames 10 includes an inner panel 20 arranged on an inner side in the vehicle width direction, and an outer panel 21 arranged on an outer side in the vehicle width direction. The main frame 10 is in a substantially rectangular shape as viewed in a cross section. A closed space is formed between the panels 20, 21 as viewed in the cross section.

The first cross-member 11 is attached to front ends of the main frames 10, and functions as a bumper reinforcement configured to reinforce a front bumper 5 (see FIG. 1). The second cross-member 12 is, at both end parts thereof, attached to the right and left main frames 10 through cross-member brackets 23 welded respectively to the right and left main frames 10. The third cross-member 13 is also, at both end parts thereof, attached to the right and left main frames 10 through cross-member brackets 24 welded respectively to the right and left main frames 10. The cross-member brackets 23 are considered as part of the second cross-member 12, and the cross-member brackets 24 are considered as part of the third cross-member 13. The fourth cross-member 14 is, at both end parts thereof, attached to the right and left main frames 10 through large gussets 25 welded respectively to the right and left main frames 10. The gussets 25 serve as brackets and reinforcements, and are considered as part of the fourth cross-member 14. Each of the fifth to seventh cross-members 15-17 is, at both end parts thereof, attached directly to the right and left main frames 10.

Each of the main frames 10 includes the following: a narrow part 10a positioned in an end part of the main frame 10 in the vehicle width direction below the engine room 2 such that a distance between the narrow parts 10a of the main frames 10 is short; a wide part 10b positioned below the cabin 3 and the deck 4 such that a distance between the wide parts 10b of the main frames 10 is longer than that between the narrow parts 10a; and a widened part 10c positioned between the narrow part 10a and the wide part 10b (in a rear end part of the engine room 2) such that a distance between the widened parts 10c of the main frames 10 is increased toward the rear (see FIG. 14 for a positional relationship among the parts 10a, 10b, 10c of the main frame 10, the engine room 2, the cabin 3, and the deck 4). The width (i.e., the cross-sectional area) of the wide part 10b itself is larger than the width (i.e., the cross-sectional area) of the narrow part 10a itself. The widened part 10c extends from a rear end of the narrow part 10a (the vicinity of a rear side of the third cross-member 13) toward the rear so as to be inclined toward the outer side in the vehicle width direction. The width (cross-sectional area) of the widened part 10c itself is increased toward the rear. The widened part 10c is connected to a front end of the wide part 10b (the vicinity of a front side of the fourth cross-member 14). Thus, the widened parts 10c of the main frames 10 and the third and fourth cross-members 13, 14 are together formed in a trapezoidal shape as viewed in the plane.

The wide part 10b is formed so as to have the maximum width (cross-sectional area) in a connection part of the wide part 10b and the fourth cross-member 14 and the vicinity thereof. The width (cross-sectional area) of the wide part 10b is gradually decreased from the fourth cross-member 14 to the sixth cross-member 16, and is substantially uniform in part of the wide part 10b from the sixth cross-member 16 toward the rear. As described above, the fourth cross-member 14 is connected to part of the wide part 10b where the width (cross-sectional area) thereof is large, and the connection part of the wide part 10b and the fourth cross-member 14 is reinforced by the large gusset 25.

Part of the wide part 10b of the main frame 10 below the cabin 3 is in a height position lower than the narrow part 10a, and the widened part 10c is downwardly inclined toward the rear. In addition, part of the wide part 10b of the main frame 10 below the deck 4 (part of the wide part 10b from the sixth cross-member 16 toward the rear) is in a height position higher than part of the wide part 10b below the cabin 3, and part of the wide part 10b below the cabin 3 is, at a rear part thereof, upwardly inclined toward the rear (see FIG. 14).

A cab-mount bracket 26 is attached to the widened part 10c of the main frame 10 in the vicinity of the front side of the fourth cross-member 14, and another cab-mount bracket 26 is attached to the wide part 10b of the main frame 10 in the vicinity of a front side of the sixth cross-member 16. Vehicle body members forming the cabin 3 are mounted on each of the cab-mount brackets 26 through a cab mount including a rubber member. Each of the cab-mount brackets 26 is welded to an outer surface of the main frame 10 in the vehicle width direction and to a lower surface of the main frame 10.

Of the vehicle body members forming the cabin 3, a vehicle body member forming a floor of the cabin 3 is a floor panel 28 and another vehicle body member partitioning between the engine room 2 and the cabin 3 is a dash panel 29, referring to FIG. 14. A lower end of the dash panel 29 is connected to a front end of the floor panel 28. A rear end part of the floor panel 28 is upwardly bent, and partitions between the cabin 3 and the deck 4.

Referring to FIG. 13, a drive system of the vehicle 1 includes an engine 32, a transmission 33, a power transfer unit 34, a front wheel propeller shaft 35, the front differential gear unit 36 (hereinafter simply referred to as a "gear unit 36"), a rear wheel propeller shaft 37, and a rear differential gear unit 38. The vehicle 1 is a four-wheel-drive vehicle (4WD vehicle) in which front wheels 6 and rear wheels 7 are driven. Thus, as compared to a two-wheel-drive vehicle (2WD vehicle) in which only the rear wheels 7 are driven, the power transfer unit 34, the front wheel propeller shaft 35, and the front differential gear unit 36 are provided as extra components in the 4WD vehicle.

Figure 15:
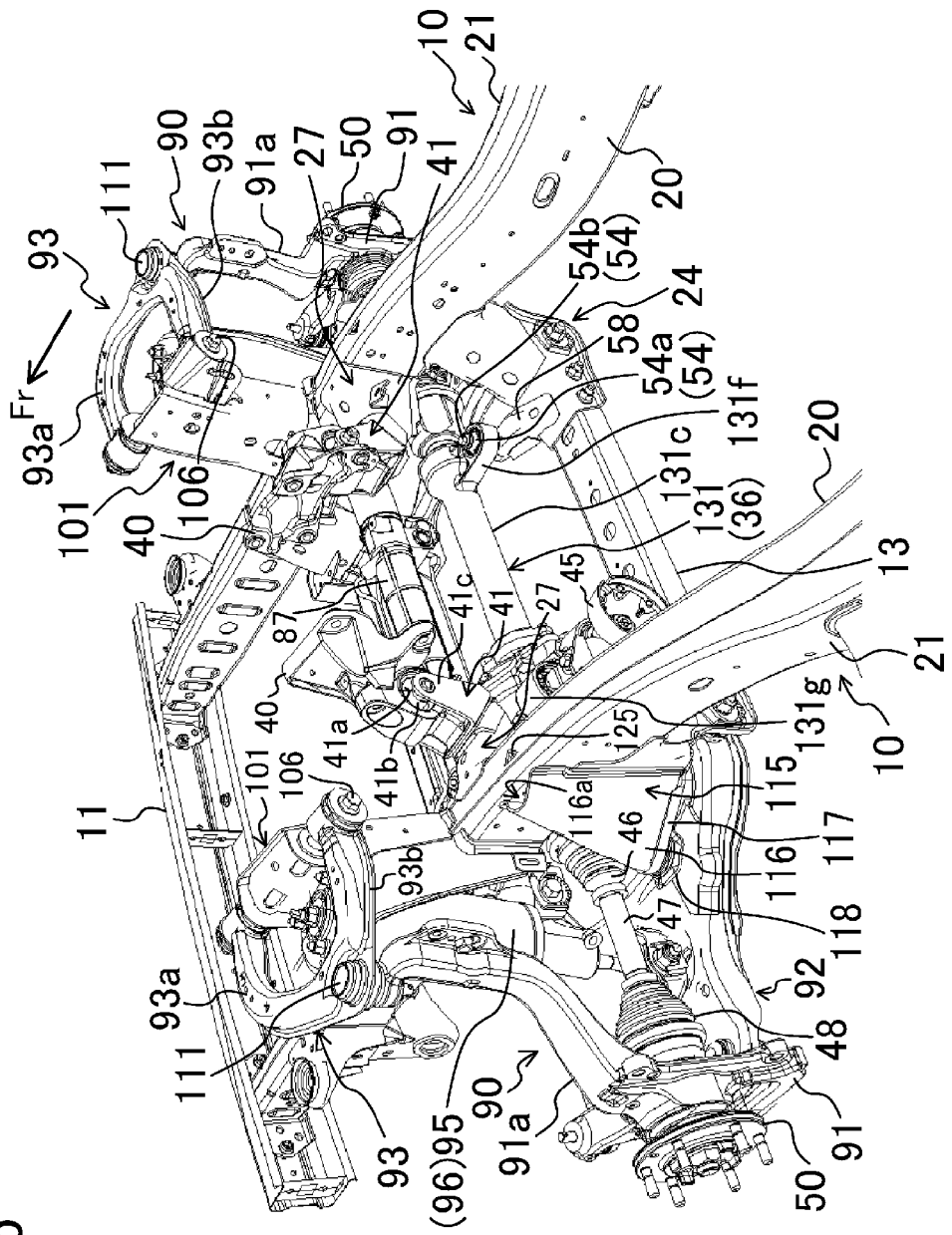
FIG. 15 is a perspective view of the front part of the component-mounted chassis frame diagonally from the upper left rear side of the vehicle.

The engine 32 is a longitudinal engine including a plurality of cylinders (in the present embodiment, five cylinders) arranged in rows in the vehicle length direction, and the transmission 33 is connected to a rear side of the engine 32. Referring to FIG. 15, a bracket 40 protruding toward the left is attached to a left side surface of the engine 32, and a bracket 40 protruding toward the right is attached to a right side surface of the engine 32. In a tip end part of the bracket 40, an engine mount 41 including a cylindrical rubber bush 41a is held such that a central axis of the rubber bush 41a extends in the vehicle length direction. The engine mount 41 further includes a central shaft 41b penetrating a center part of the rubber bush 41a in the vehicle length direction, and a support member 41c configured to support the central shaft 41b at both ends thereof. An engine mount bracket 27 is attached to the narrow part 10a of the main frame 10 so as to be positioned below the support member 41c. The support member 41c is attached onto the engine mount bracket 27, and therefore the engine 32 is elastically supported on the engine mount brackets 27 through the brackets 40 and the engine mounts 41.

Referring to FIGS. 7-9 and 21, each of the engine mount brackets 27 includes an upper member 27a and a lower member 27b which are welded to an inner surface of the main frame 10 in the vehicle width direction (surface of the inner panel 20 of the main frame 10) and protrude from the inner surface toward the inner side in the vehicle width direction (toward the center of the vehicle 1 in the width direction thereof). The upper member 27a is formed in a substantially inverted U-shape as viewed in a cross section along the vehicle length direction, and the lower member 27b is formed in a substantially U-shape as viewed in the cross section along the vehicle length direction. Side end parts of the upper member 27a in the vehicle length direction and side end parts of the lower member 27b in the vehicle length direction are joined together. That is, the side end part of the upper member 27a on the front side and the side end part of the lower member 27b on the front side are joined together, and the side end part of the upper member 27a on the rear side and the side end part of the lower member 27b on the rear side are joined together. A space is formed between the members 27a, 27b, and opens on the inner side in the vehicle width direction. The support member 41c of the engine mount 41 is attached to an upper surface of the upper member 27a through a reinforcing member 27c. On the other hand, a notch 27d opening on the inner side in the vehicle width direction and formed in a substantially U-shape as viewed in the plane is formed in a bottom part (horizontally-extending part) of the lower member 27b (see FIGS. 9 and 21). The notch 27d is formed so that the engine mount bracket 27 can be crushed in the vehicle length direction as much as possible upon a frontal collision of the vehicle 1. At the inner surface of the main frame 10 in the vehicle width direction (surface of the inner panel 20 of the main frame 10), an elongated hole 128 extending in the vehicle length direction is formed so as to overlap with the engine mount bracket 27 in the vehicle length direction (formed in a position corresponding the space between the members 27a, 27b) (see FIG. 9). The elongated hole 128 allows the engine mount bracket 27 and an attachment part of the main frame 10 and the engine mount bracket 27 to be crushed in the vehicle length direction as much as possible.

The power transfer unit 34 is connected to a rear side of the transmission 33, and distributes output of the transmission 33 to the front wheels 6 and the rear wheels 7. A mount attachment part 14a provided in a center part of an upper surface of the fourth cross-member 14 in the vehicle width direction supports the power transfer unit 34 through a rubber mount.

A rear end of the front wheel propeller shaft 35 extending along a left side of the transmission 33 in the vehicle length direction is connected to a left side part (part protruding toward the left) of the power transfer unit 34, and a front end of the rear wheel propeller shaft 37 extending in the vehicle length direction is connected to a rear end of the power transfer unit 34.

The rear end of the front wheel propeller shaft 35 is connected to the power transfer unit 34 through a constant velocity joint 44, and a front end of the front wheel propeller shaft 35 is connected to the gear unit 36 (specifically connected to an input shaft which will be described later) through a constant velocity joint 45.

Referring to FIGS. 15-20, the gear unit 36 includes a differential gear, the input shaft connected to the front wheel propeller shaft 35, extending in the vehicle length direction, and configured to input power to the differential gear, right and left output shafts extending in the vehicle width direction and configured to transmit output of the differential gear respectively to the right and left front wheels 6, and a case 131 accommodating the differential gear, the input shaft, and the right and left output shafts. The case 131 includes a gear accommodation part 131a accommodating the differential gear, a left output shaft accommodation part 131b extending from the gear accommodation part 131a to one side (to the left side) in the vehicle width direction and accommodating a left output shaft, a right output shaft accommodation part 131c extending from the gear accommodation part 131a to the other side (to the right side) in the vehicle width direction and accommodating a right output shaft, and an input shaft accommodation part 131d extending from the gear accommodation part 131a toward the rear side and accommodating the input shaft. The left output shaft accommodation part 131b is in a cylindrical shape covering the left output shaft, and the right output shaft accommodation part 131c is in a cylindrical shape covering the right output shaft. A rear end part of the input shaft (i.e., the constant velocity joint 45) protrudes from a rear end of the input shaft accommodation part 131d.

Since the front wheel propeller shaft 35 is positioned on the left side of the transmission 33, the gear accommodation part 131a and the input shaft accommodation part 131d are positioned on the left side of the engine 32 (i.e., on the left side relative to the center of the vehicle 1 in the width direction thereof), and are closer to the left main frame 10 than the right main frame 10. Thus, the length of the right output shaft accommodation part 131c in the vehicle width direction is longer than that of the left output shaft accommodation part 131b, and the right output shaft accommodation part 131c passes below the engine 32 and extends to the vicinity of the right main frame 10.

Part of the gear unit 36 is positioned in a region surrounded by the right and left engine mount brackets 27 (positioned at the rear of the second cross-member 12) and the second cross-member 12.

Figure 16:
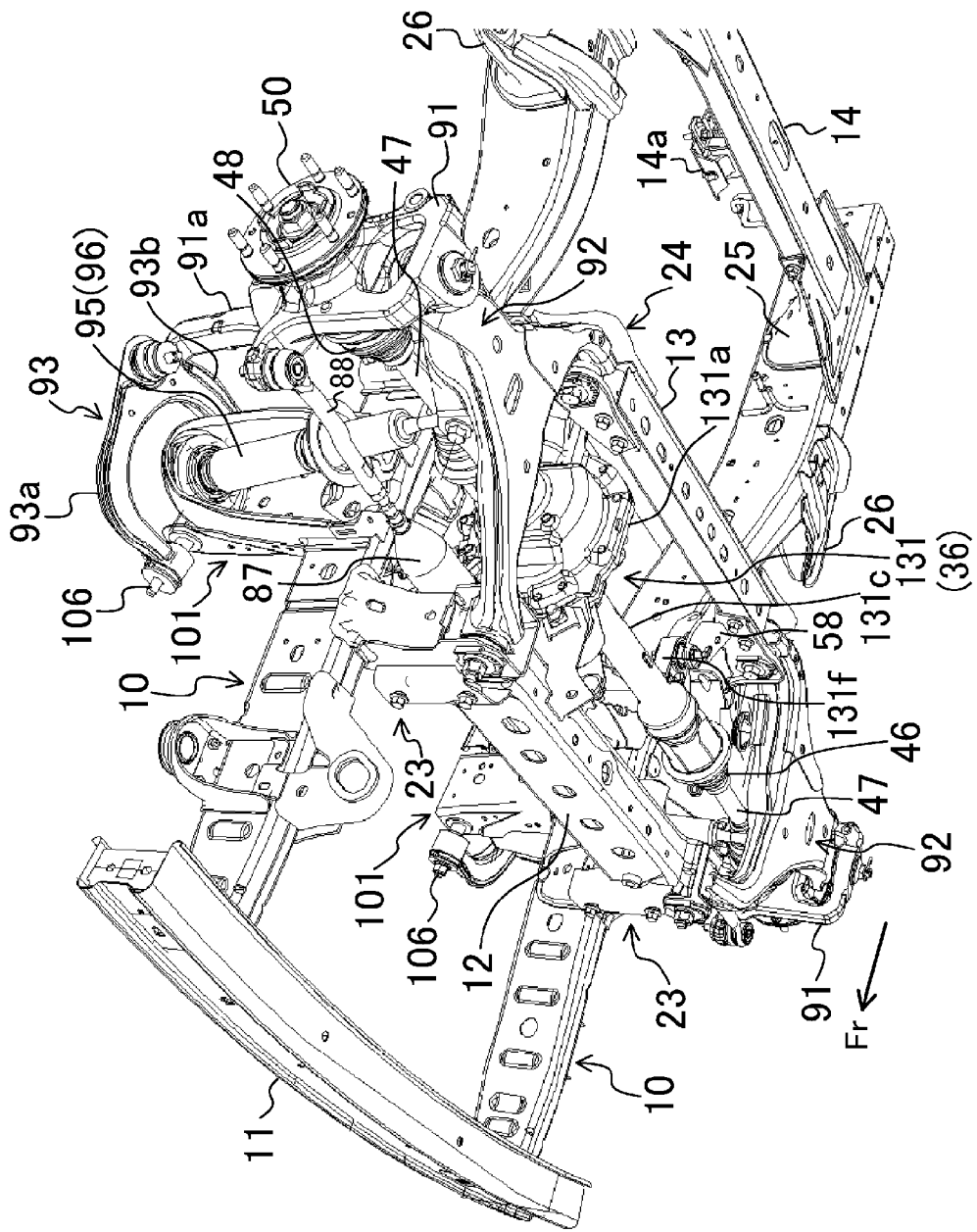
FIG. 16 is a perspective view of the front part of the component-mounted chassis frame diagonally from a lower left front side of the vehicle.
Figure 17:
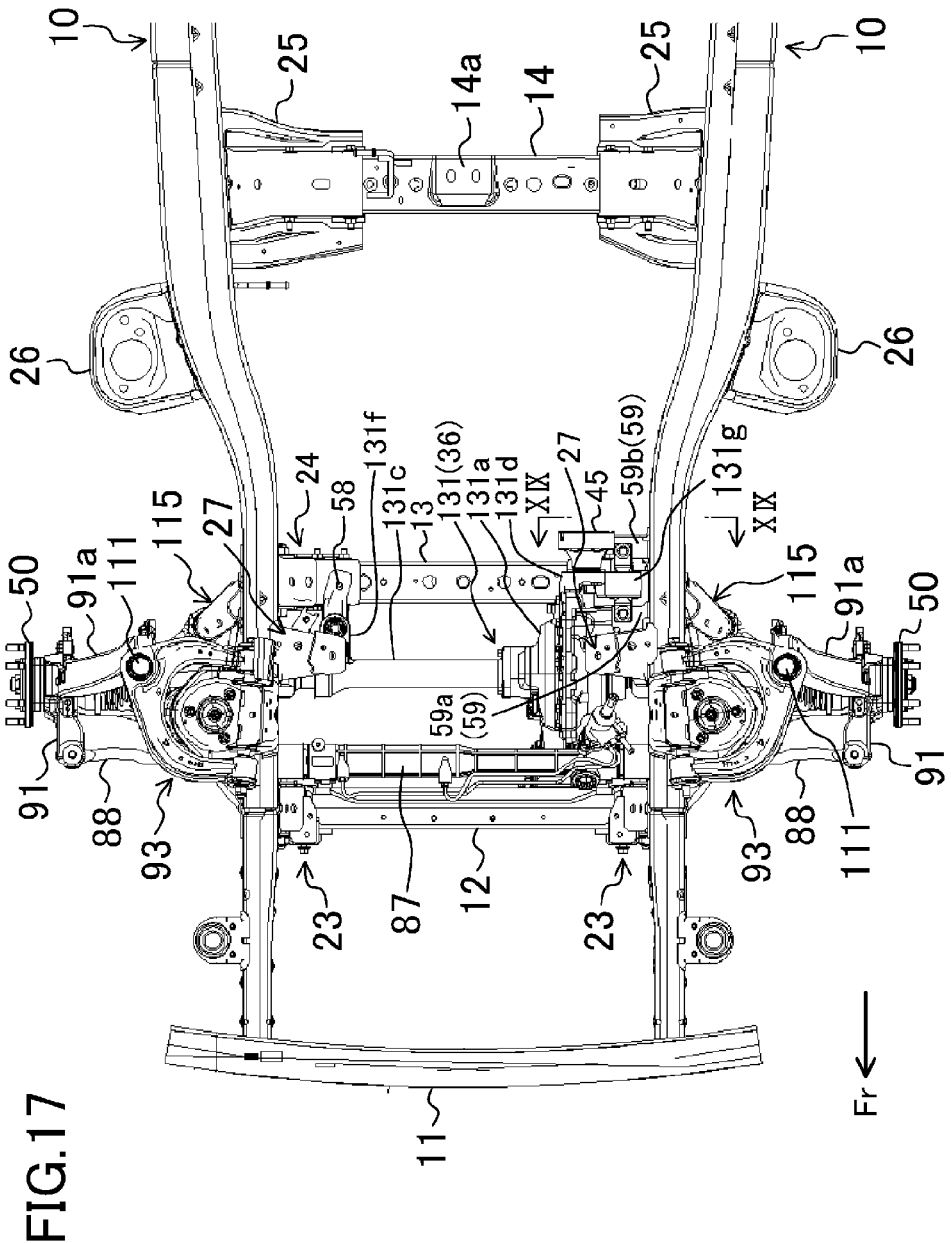
FIG. 17 is a plan view illustrating the front part of the component-mounted chassis frame.
Figure 18:
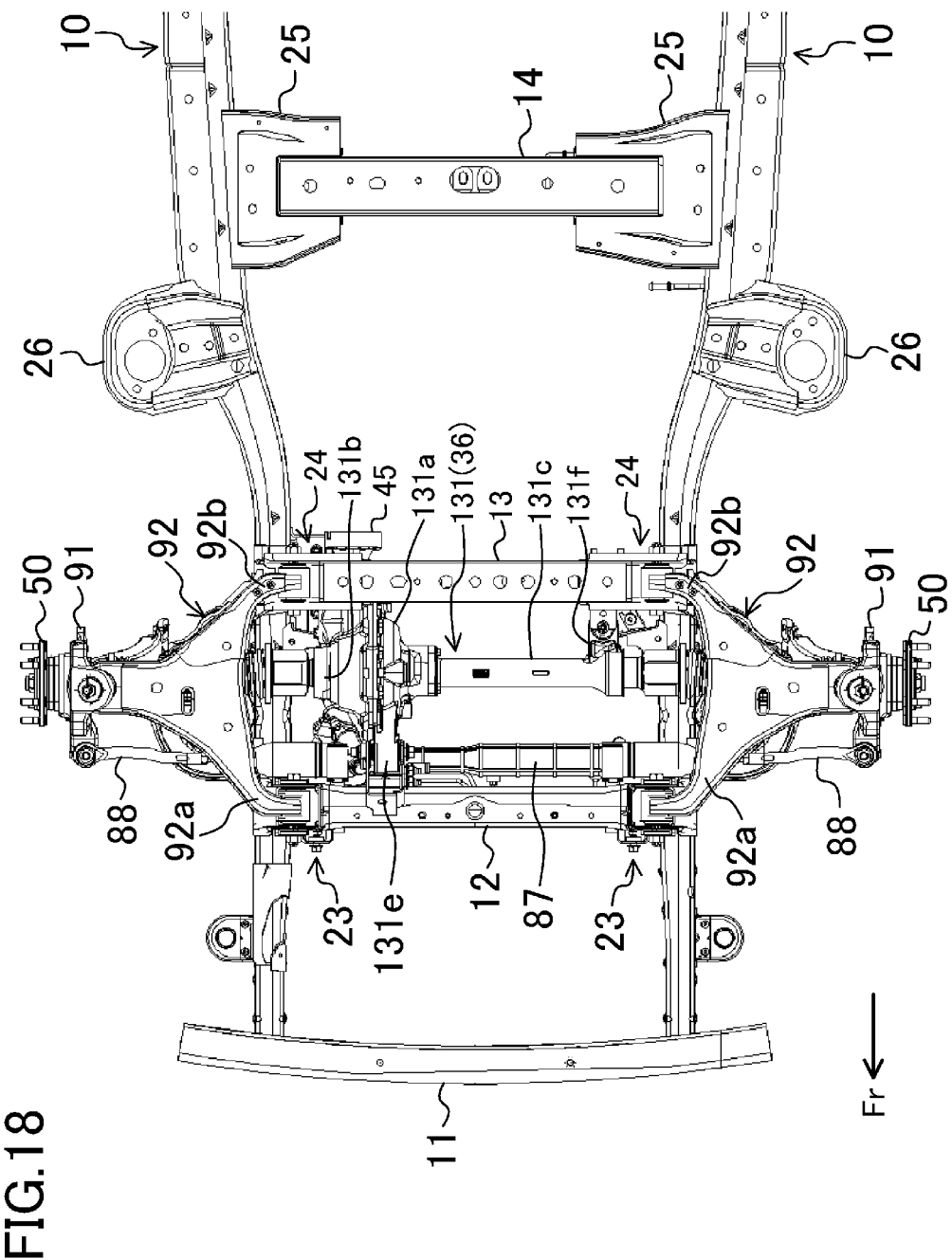
FIG. 18 is a bottom view illustrating the front part of the component-mounted chassis frame.
Figure 19:
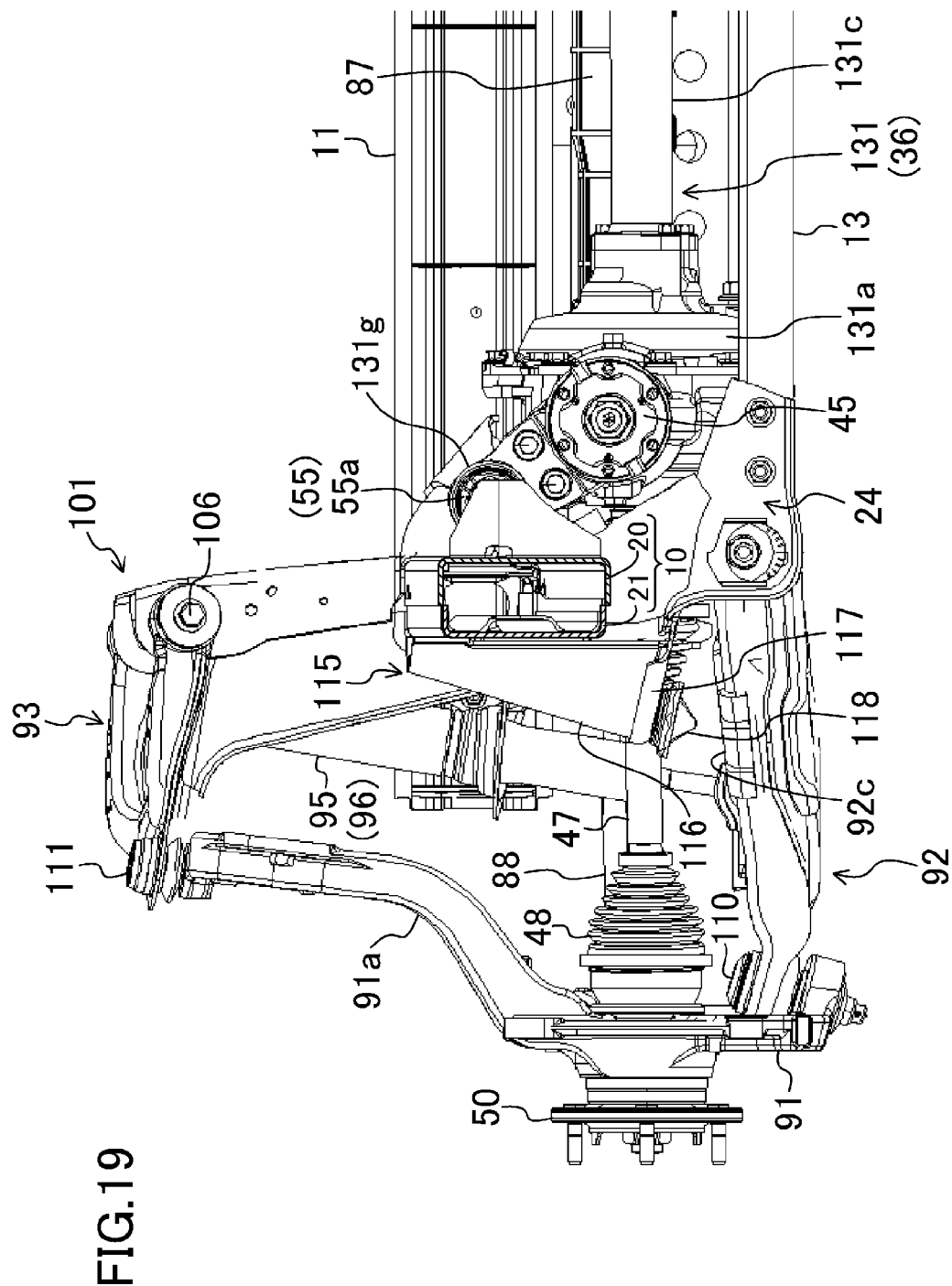
FIG. 19 is a cross-sectional view along an XIX-XIX line illustrated in FIG. 17.

Referring to FIGS. 15 and 16, one of the output shafts is connected to a right front wheel drive shaft 47 extending in the vehicle width direction through a constant velocity joint accommodated in a boot 46, and the other output shaft is connected to a left front wheel drive shaft 47 extending in the vehicle width direction through a constant velocity joint accommodated in a boot 46. The right front wheel drive shaft 47 is connected to a hub 50 holding the right front wheel 6 through a constant velocity joint accommodated in a boot 48, and the left front wheel drive shaft 47 is connected to a hub 50 holding the left front wheel 6 through a constant velocity joint accommodated in a boot 48. Such constant velocity joints are adaptable to vertical movement of the front wheel 6 relative to the output shaft and movement of the front wheel 6 by steering which will be described later.

According to the foregoing configuration, power of the engine 32 is transmitted to the right and left front wheels 6 through the transmission 33, the power transfer unit 34, the front wheel propeller shaft 35, the gear unit 36, and the right and left front wheel drive shafts 47.

The gear unit 36 is elastically supported by the chassis frame 9 at three points. Specifically, a first mount bracket 57 configured to support a first mount 53 including a cylindrical rubber bush 53a is provided in a position closer to the left on a rear part of the second cross-member 12, i.e., provided on part of the second cross-member 12 displaced from the center of the vehicle 1 in the width direction thereof (from a center axis line of the vehicle 1 in the width direction thereof) toward the left side in the vehicle width direction (see FIGS. 3, 5, 6, 20, 21, and 25-29). Note that, in the present embodiment, the center of the vehicle 1 in the width direction thereof is coincident with the center of the second cross-member 12 in the vehicle width direction.

A second mount bracket 58 configured to support a second mount 54 including a cylindrical rubber bush 54a is provided in a right end part of an upper surface of the third cross-member 13 (specifically on an upper surface of the cross-member bracket 24) so as to protrude toward the front (see FIGS. 3, 4, 15-17, and 30).

A third mount bracket 59 configured to support a third mount 55 including a cylindrical rubber bush 55a is provided in a position above the third cross-member 13 on the inner surface of the left main frame 10 (main frame 10 closer to the input shaft accommodation part 131d) in the vehicle width direction (see FIGS. 3, 4, 7-9, 17, 20, and 31). The third mount bracket 59 is divided into a front divided part 59a and a rear divided part 59b.

The first mount 53 is equivalent to a mount part or a first mount part of the present invention, and the first mount bracket 57 is equivalent to a support mount bracket of the present invention. In addition, the second mount 54 is equivalent to a second mount part of the present invention, and the third mount 55 is equivalent to a third mount part of the present invention.

The first mount 53 further includes a central shaft 53b penetrating a center part (center hole) of the rubber bush 53a. The central shaft 53b is, at both end parts thereof, supported by the first mount bracket 57. The central shaft 53b extends in the vehicle width direction in such a supported state. That is, the first mount 53 is attached to the first mount bracket 57 such that the central shaft 53b of the first mount 53 extends in the vehicle width direction.

The second mount 54 further includes a central shaft 54b penetrating a center part (center hole) of the rubber bush 54a. The central shaft 54b extends in the vertical direction. One end part (lower end part) of the central shaft 54b is an external thread part to be engaged with an internal thread part of a weld nut provided on a lower surface of the second mount bracket 58, and the other end part (upper end part) of the central shaft 54b is in a hexagonal shape so as to be engaged with a tool for fastening the external thread part into the internal thread part. By such fastening, the central shaft 54b is fixed to the second mount bracket 58 with the central shaft 54b penetrating the center part of the rubber bush 54a mounted on an upper surface of the second mount bracket 58. That is, the second mount 54 is attached to the second mount bracket 58 such that the central shaft 54b of the second mount 54 extends in the vertical direction.

The third mount 55 further includes a central shaft 55b penetrating a center part (center hole) of the rubber bush 55a. The central shaft 55b extends in the vehicle length direction. One of end parts of the central shaft 55b protrudes from the rubber bush 55a toward the front, and the other end part of the central shaft 55b protrudes from the rubber bush 55a toward the rear. The protruding end parts are in a plate shape extending in the horizontal direction. One of the end parts is fixed to the front divided part 59a by fastening with a bolt 60 and a nut 61 (see FIGS. 9, 20, and 31) in the state in which the end part is mounted on the front divided part 59a, and the other end part is fixed to the rear divided part 59b by fastening with a bolt 60 and a nut 61 in the state in which the end part is mounted on the rear divided part 59b. That is, the third mount 55 is attached to the third mount bracket 59 (i.e., the front divided part 59a and the rear divided part 59b) such that the central shaft 55b of the third mount 55 extends in the vehicle length direction.

Figure 20:
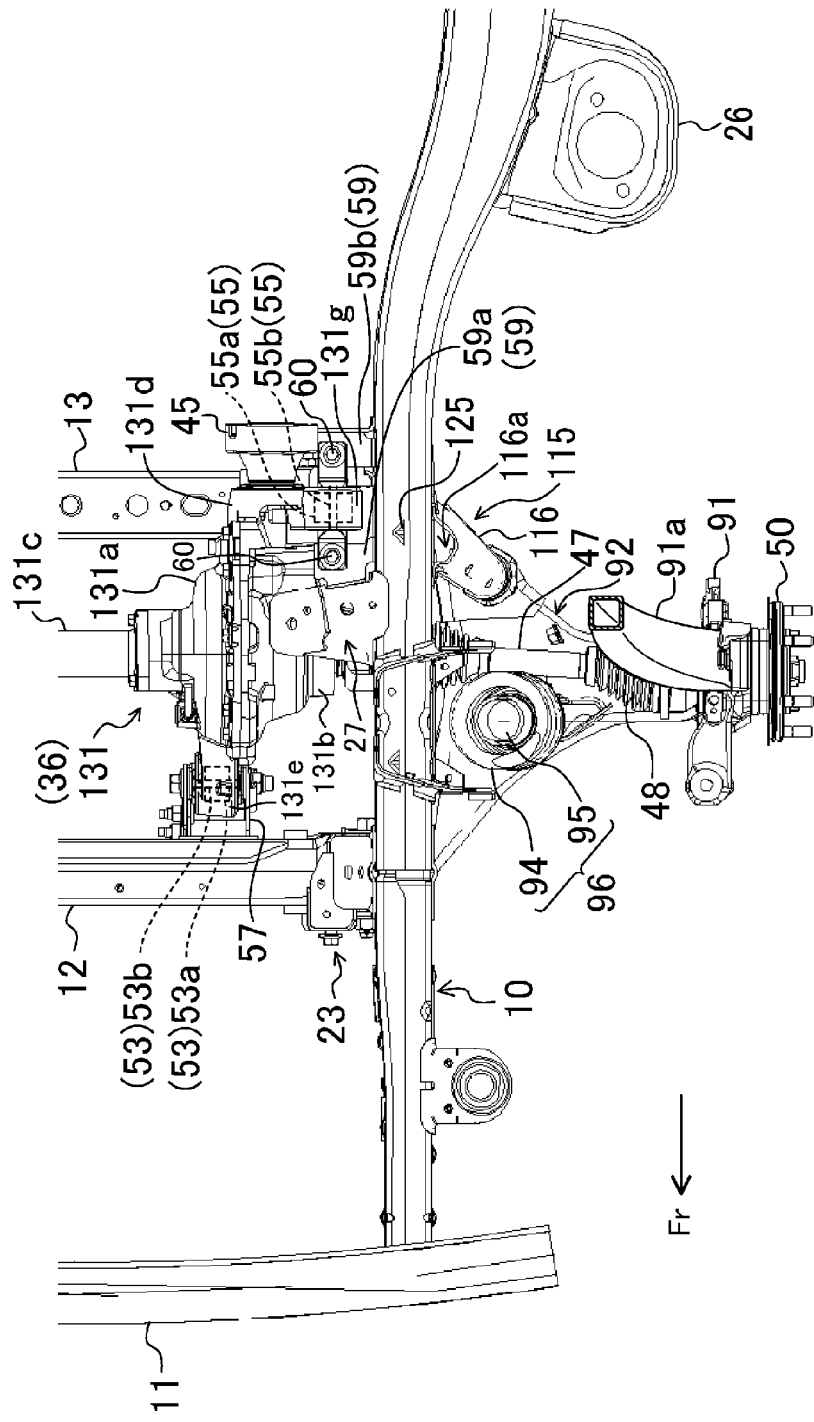
FIG. 20 is a cross-sectional view along an XX-XX line illustrated in FIG. 14.
Figure 28:
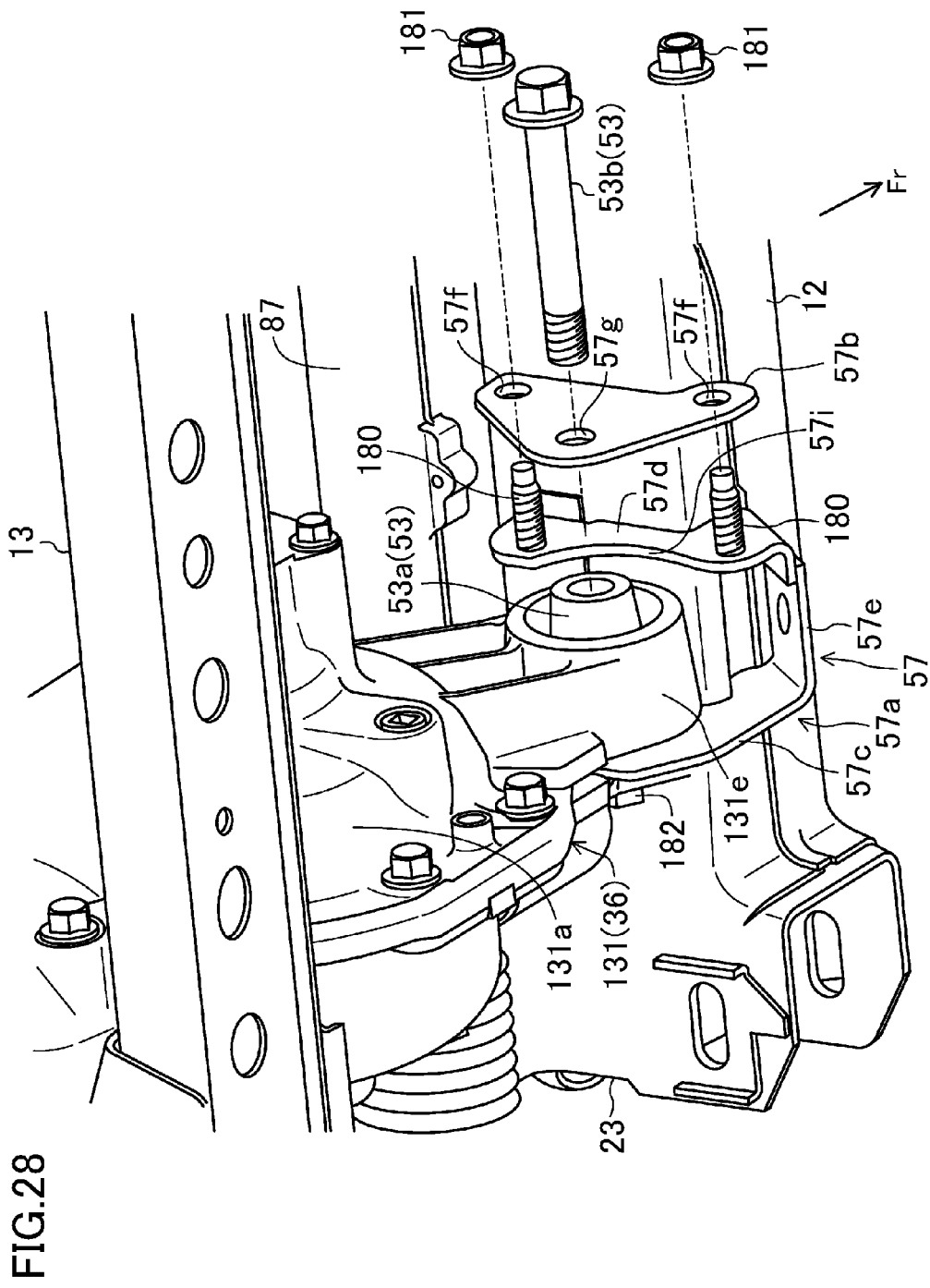
FIG. 28 is an exploded perspective view of the vicinity of a first mount bracket illustrating the state in which a first mount is being attached to the first mount bracket.
Figure 29:
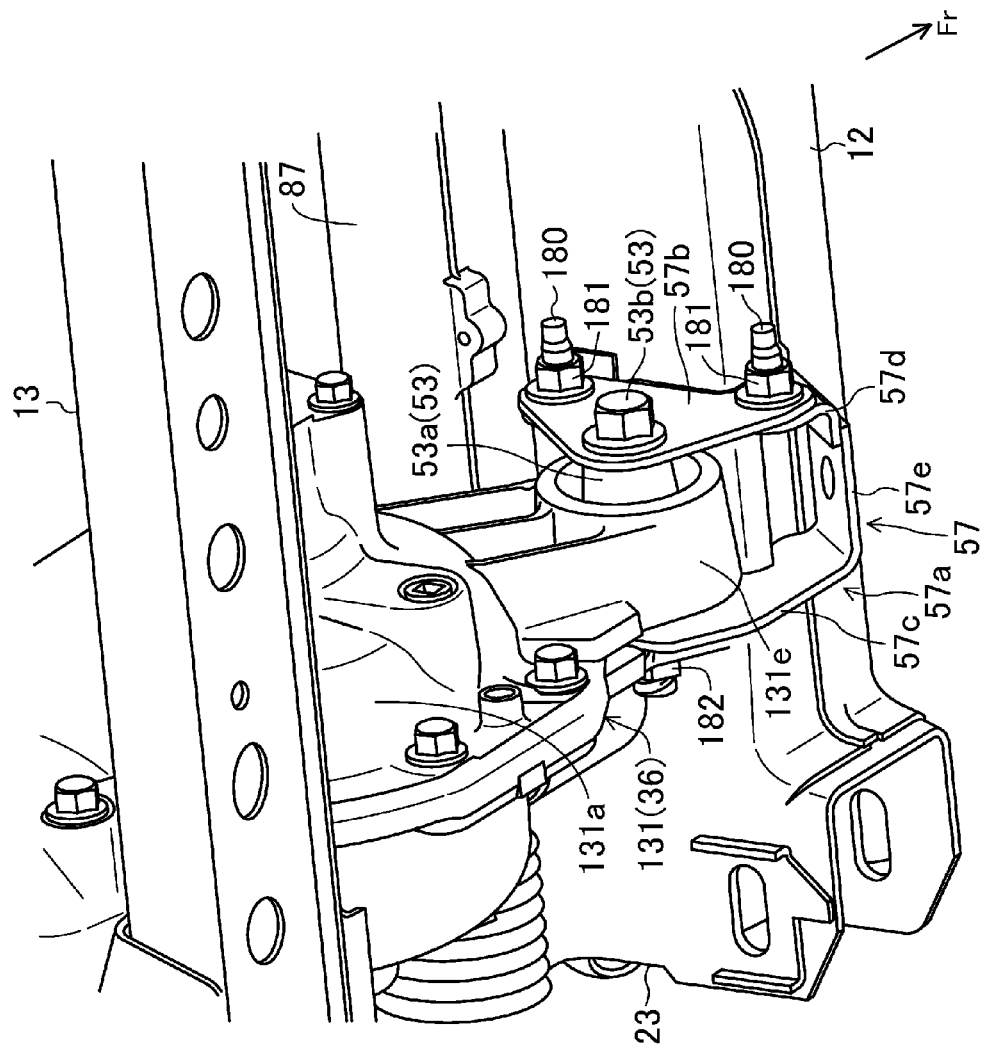
FIG. 29 is a perspective view of the vicinity of the first mount bracket illustrating the state in which the first mount is attached to the first mount bracket.

A first mount holding part 131e protruding toward the front and configured to hold, at a tip end thereof, the periphery of the rubber bush 53a of the first mount 53 is formed in a front part of the gear accommodation part 131a of the gear unit 36 (see FIGS. 20, 28, and 29). In addition, a second mount holding part 131f protruding toward the rear and configured to hold, at a tip end thereof, the periphery of the rubber bush 54a of the second mount 54 is formed in a tip end part (right end part) of the right output shaft accommodation part 131c (see FIGS. 15, 17, and 30). Further, a third mount holding part 131g protruding toward the upper left and configured to hold, at a tip end thereof, the periphery of the rubber bush 55a of the third mount 55 is formed in a rear part of the input shaft accommodation part 131d (see FIGS. 17, 20, and 31). As will be described later, the third mount holding part 131g is configured so as to be detachable from the input shaft accommodation part 131d.

Figure 21:
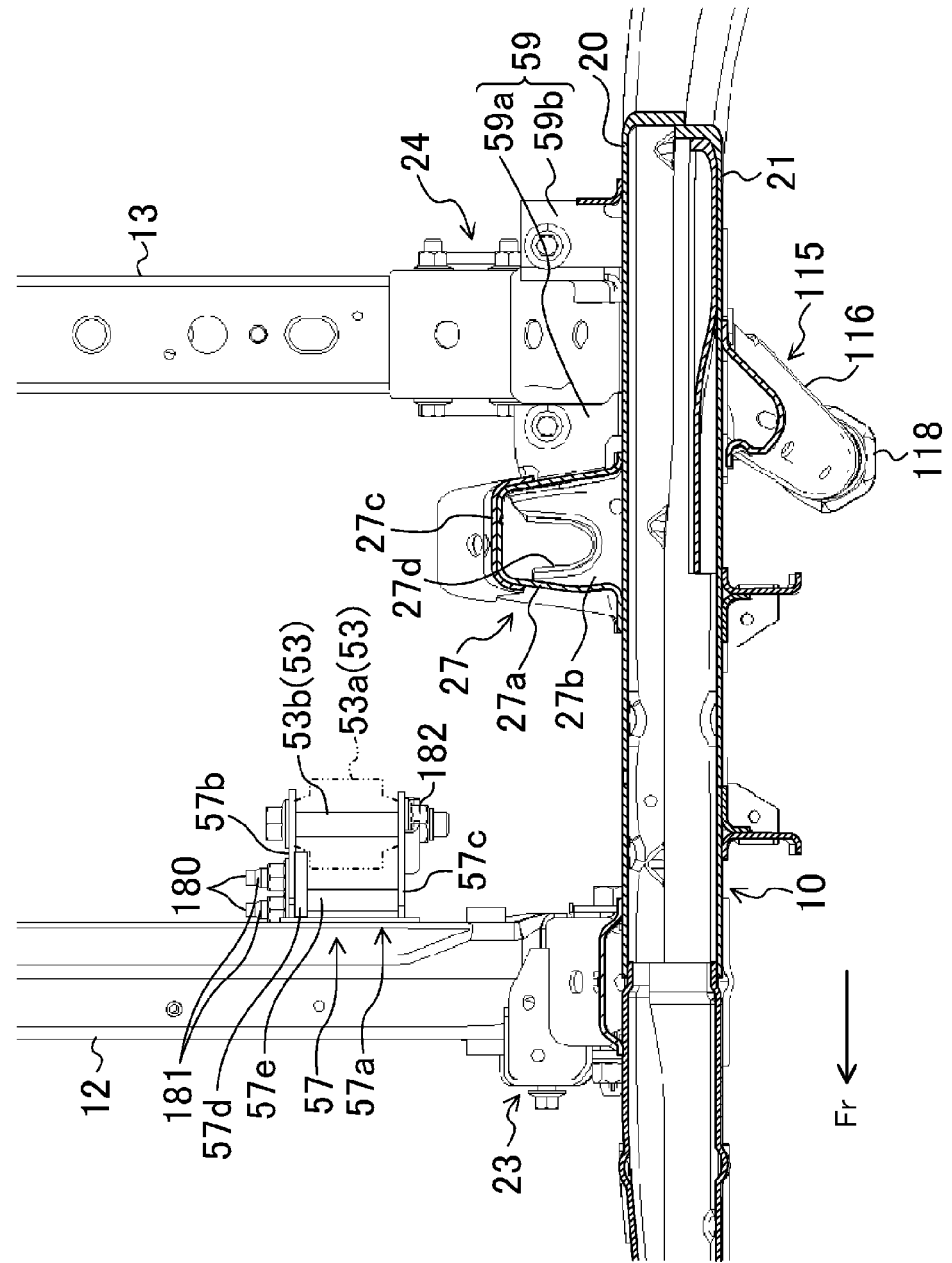
FIG. 21 is a cross-sectional view along an XXI-XXI line illustrated in FIG. 14 (note that most of the mounted components illustrated in FIG. 20 are not shown).
Figure 22:
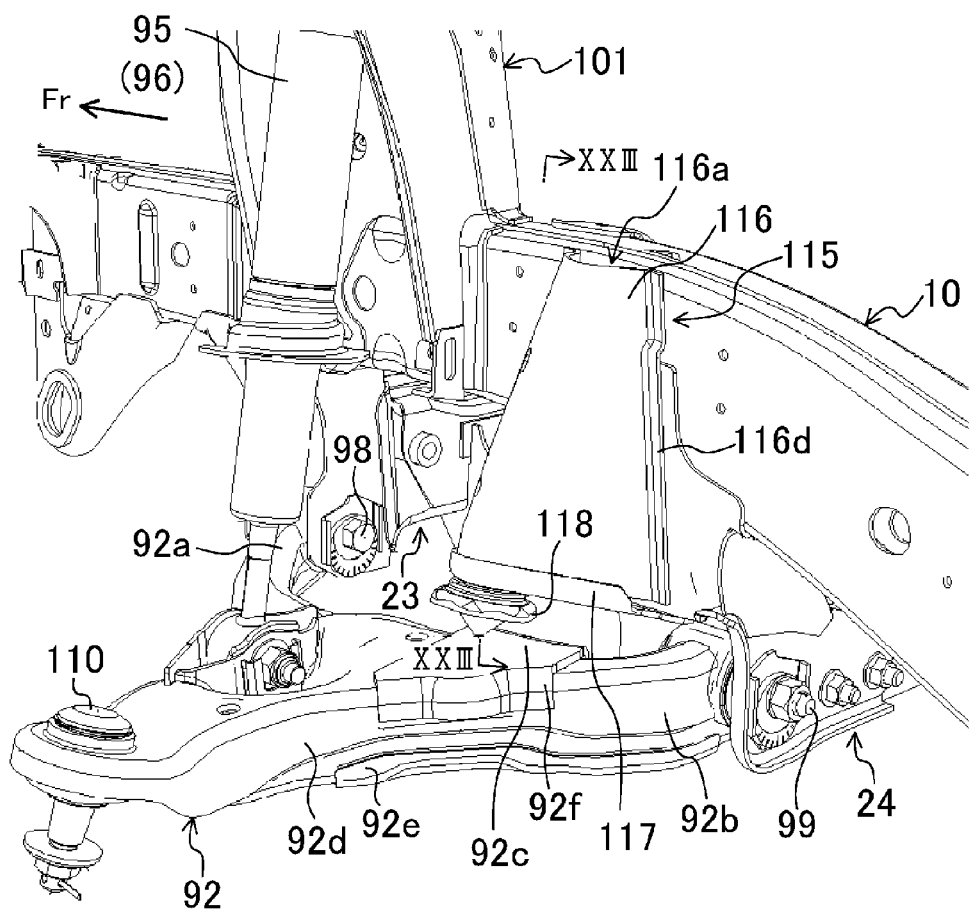
FIG. 22 is a perspective view illustrating the vicinity of a bump stopper in the outer part of the left main frame of the component-mounted chassis frame in the vehicle width direction.
Figure 23:
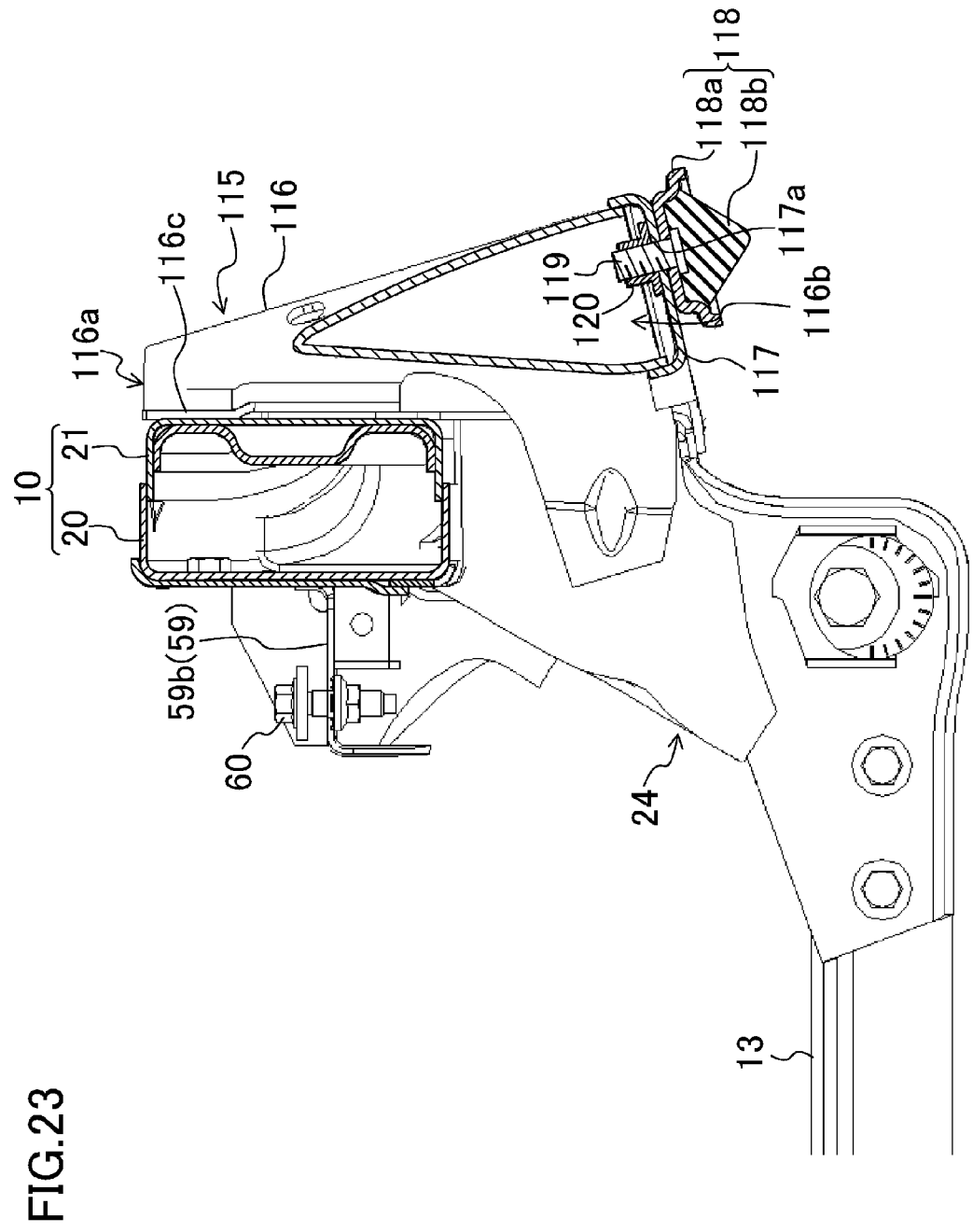
FIG. 23 is a cross-sectional view along an XXIII-XXIII line illustrated in FIG. 22.

The configuration of the first mount bracket 57 supporting the first mount 53 will be described in more detail. Referring to FIGS. 21 and 28, the first mount bracket 57 includes a bracket body 57a which is a plate-shaped member, and an inner plate 57b which is a plate-shaped member configured so as to be detachable from the bracket body 57a. The bracket body 57a includes an outer plate 57c extending in the vertical direction on the outer side in the vehicle width direction relative to the first mount 53 (first mount holding part 131e) and fixed to the rear surface of the second cross-member 12, a plate attachment member 57d extending in the vertical direction on the inner side in the vehicle width direction relative to the first mount 53 (first mount holding part 131e) and fixed to the rear surface of the second cross-member 12, and a connection plate 57e connecting a lower end of the outer plate 57c and a lower end of the plate attachment member 57d. The outer plate 57c, the plate attachment member 57d, and the connection plate 57e are integrally formed. The connection plate 57e is connected to a lower surface of the second cross-member 12. The inner plate 57b and the outer plate 57c protrudes from the connection plate 57e toward the rear. The plate attachment member 57d protrudes from the second cross-member 12 toward the rear. The inner plate 57b is to be attached to the plate attachment member 57d. The inner plate 57b attached to the plate attachment member 57d is positioned on the inner side in the vehicle width direction relative to the first mount 53 with the inner plate 57b facing the outer plate 57c, and sandwiches, together with the outer plate 57c, the first mount 53 from both sides in the vehicle width direction.

The connection plate 57e and the plate attachment member 57d are equivalent to a base part of the present invention, and the plate attachment member 57d is equivalent to an attachment part configured to detachably attach and fix a detachable fixing part and protruding from the cross-member (second cross-member 12) toward the detachable fixing part (toward the rear). The inner plate 57b and the outer plate 57c are equivalent to a pair of fixing parts of the present invention. The inner plate 57b is equivalent to a fixing part (detachable fixing part) on a side closer to the center of the vehicle 1 in the width direction thereof or to a fixing part on a side farther from one (left one) of the main frames 10, and the outer plate 57c is equivalent to a fixing part on a side farther from the center of the vehicle 1 in the width direction thereof or to a fixing part on a side closer to one (left one) of the main frames 10.

Two stud bolts 180 apart from each other in the vertical direction are provided so as to stand on the plate attachment member 57d and extend toward the center of the vehicle 1 in the width direction thereof (toward the inner side in the vehicle width direction). In the inner plate 57b, two bolt insertion holes 57f into each of which the stud bolt 180 is inserted are formed, and a shaft insertion hole 57g into which the central shaft 53b of the first mount 53 is inserted in parallel to the stud bolt 180 is formed (see FIG. 28). In addition, a shaft insertion hole 57h (see FIG. 6) into which the central shaft 53b penetrating, in the vehicle width direction, the center part (center hole) of the rubber bush 53a of the first mount 53 in parallel to the stud bolt 180 is inserted is formed in the outer plate 57c. One end part (end part on the outer side in the vehicle width direction) of the central shaft 53b is an external thread part to be engaged with an internal thread part of a nut 182 (see FIGS. 21, 28, and 29), and the other end part (end part on the inner side in the vehicle width direction) is in a hexagonal shape so as to be engaged with a tool for fastening the external thread part into the internal thread part of the nut 182. The two stud bolts 180 are equivalent to fixing part fastening bolts of the present invention, and the two bolt insertion holes 57f are equivalent to first holes of the present invention. In addition, the central shaft 53b is equivalent to a mount part fastening bolt of the present invention, and the shaft insertion hole 57g is equivalent to a second hole of the present invention.

In a tip end of the protrusion of the plate attachment member 57d (rear end part of the plate attachment member 57d), an arc-shaped recess 57i is, as viewed in the vehicle width direction, formed in order to avoid an overlap with an outer shape of the first mount 53 supported by the first mount bracket 57 (see FIG. 28). The recess 57i is positioned between the two stud bolts 180.

The inner plate 57b is detached from the bracket body 57a before the attachment of the gear unit 36 to the chassis frame 9. The rubber bush 53a is attached to the first mount holding part 131e in advance. A surface of the rubber bush 53a on the outer side in the vehicle width direction is pressed against a surface of the outer plate 57c on the inner side in the vehicle width direction. In such a state, the inner plate 57b is attached and fixed to the plate attachment member 57d by the stud bolts 180 and nuts 181 to be engaged with the stud bolts 180. Subsequently, the central shaft 53b is, from the inner side in the vehicle width direction, inserted into the shaft insertion hole 57g, the center part (center hole) of the rubber bush 53a, and the shaft insertion hole 57h in this order. Then, the nut 182 is fastened to the external thread part of the central shaft 53b on the outer side in the vehicle width direction relative to the outer plate 57c, and the central shaft 53b is fixed to the inner plate 57b and the outer plate 57c. The nut 182 is a nut with a flange part, and is, referring to FIG. 6, held by inserting the flange part of the nut 182 into a pocket part formed in a clearance between a holding member 185 provided in a U-shape so as to surround the shaft insertion hole 57h on a surface of the outer plate 57c on the outer side in the vehicle width direction, and the surface of the outer plate 57c on the outer side in the vehicle width direction. In such a state, the hexagonal nut 182 cannot rotate because the nut 182 contacts an inner peripheral part of the substantially U-shaped holding member 185. The nut 182 is attached to the outer plate 57c in the state in which the nut 182 cannot rotate. As a result, an end part of the central shaft 53b on the inner side in the vehicle width direction is rotated by the tool, thereby fastening the external thread part of the central shaft 53b into the internal thread part of the nut 182. Note that the nut 182 may be a weld nut welded to the periphery of the shaft insertion hole 57h on the surface of the outer plate 57c on the outer side in the vehicle width direction in order to prevent the rotation of the nut 182.

The following can be performed: attachment of the inner plate 57b to the plate attachment member 57d (screwing of the nuts 181 into the stud bolts 180) through a relatively-large workspace on the inner side (center side) in the vehicle width direction; and attachment of the central shaft 53b to the inner plate 57b and the outer plate 57c (fastening of the first mount 53 to the inner plate 57b and the outer plate 57c) through the relatively-large workspace on the inner side in the vehicle width direction.

Since the stud bolts 180 and the central shaft 53b extend parallel to the vehicle width direction, the central shaft 53b, the nuts 181, and the inner plate 57b can be moved in the vehicle width direction, and then the inner plate 57b and the central shaft 53b can be detached. Thus, even if there is no workspace at the front and rear of the first mount 53, the space on the inner side in the vehicle width direction can be used to perform the attachment of the first mount 53, and the foregoing fastening can be performed in one direction. Consequently, workability is improved.

The surface of the rubber bush 53a on the outer side in the vehicle width direction contacts the surface of the outer plate 57c on the inner side in the vehicle width direction, and a surface of the inner plate 57b on the outer side in the vehicle width direction contacts a surface of the rubber bush 53a on the inner side in the vehicle width direction. Thus, the rubber bush 53a is sandwiched between the inner plate 57b and the outer plate 57c which are positioned respectively on both sides of the rubber bush 53a in the vehicle width direction. The central shaft 53b is fixed to the inner plate 57b and the outer plate 57c with the central shaft 53b penetrating the center part (center hole) of the rubber bush 53a in the vehicle width direction. In such a manner, the first mount 53 is fastened to the inner plate 57b and the outer plate 57c of the first mount bracket 57 such that the central shaft 53b of the first mount 53 extends in the vehicle width direction, and is supported by the inner plate 57b and the outer plate 57c of the first mount bracket 57.

Thus, the gear unit 36 is attached to the chassis frame 9 through the first to third mounts 53-55 and the first to third mount brackets 57-59. In such a state, the central shafts 53b, 54b, 55b of the first to third mounts 53-55 extend in directions different from each other.

Figure 24:
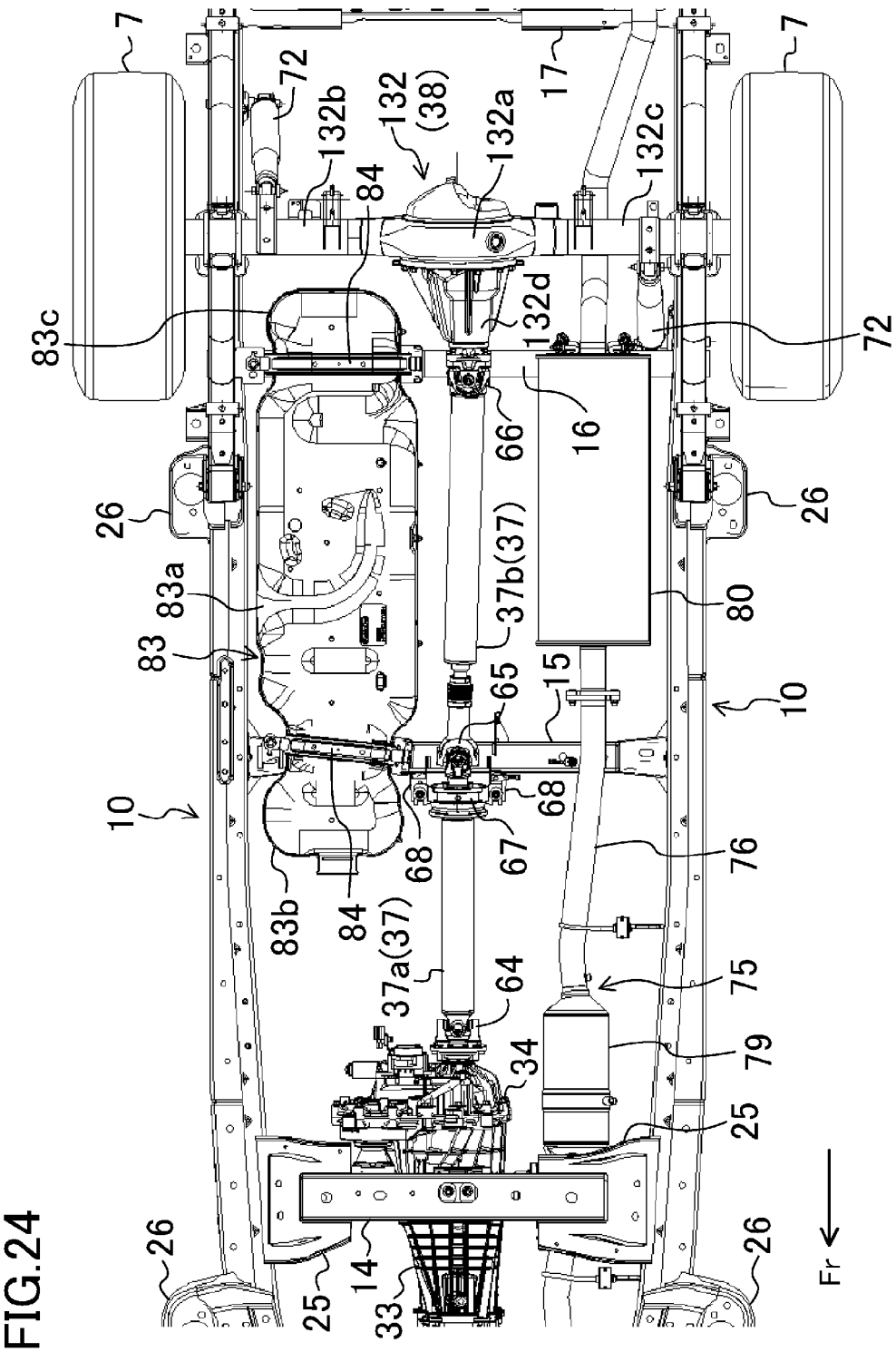
FIG. 24 is a bottom view illustrating a rear part of the component-mounted chassis frame.

Referring to FIGS. 13 and 24, the rear wheel propeller shaft 37 includes a front shaft 37a and a rear shaft 37b connected together through a joint (in the present embodiment, a universal joint 65). A front end of the front shaft 37a is connected to the rear end of the power transfer unit 34 through a universal joint 64, and a rear end of the front shaft 37a is connected to a front end of the rear shaft 37b through the universal joint 65 (see FIG. 24) positioned below the fifth cross-member 15. The front shaft 37a extends, as viewed in the plane, straight from the universal joint 64 toward the rear in the middle between the main frames 10 in the vehicle width direction. The front shaft 37a is downwardly inclined toward the rear.

Referring to FIG. 24 (since FIG. 24 is a bottom view, the right and left are opposite as those shown in FIG. 13), the rear shaft 37b extends from the universal joint 65 toward the rear, and is connected to the rear differential gear unit 38 (specifically connected to an input shaft which will be described later) through a universal joint 66. The rear shaft 37b is downwardly inclined toward the rear, and is slightly inclined toward a rear right side (a side opposite to a fuel tank 83 which will be described later) as viewed in the plane. Thus, as viewed in the plane, the rear wheel propeller shaft 37 is bent at the universal joint 65 such that the universal joint 65 is positioned on the left side relative to a straight line connecting both ends of the rear wheel propeller shaft 37 (the front end of the front shaft 37a and a rear end of the rear shaft 37b).

The rear wheel propeller shaft 37 is, at a middle part in a length direction thereof, supported by a propeller shaft center bearing 67 (hereinafter simply referred to as a "center bearing 67"). Specifically, the rear wheel propeller shaft 37 is, at the vicinity of the rear end of the front shaft 37a (part of the front shaft 37a near the universal joint 65), supported by the center bearing 67. The center bearing 67 is supported by two bearing brackets 68 attached to the fifth cross-member 15, and is positioned near the front side of the fifth cross-member 15. Upon the frontal collision of the vehicle 1, impact force from the front to the rear acts on the rear wheel propeller shaft 37 (front shaft 37a) due to, e.g., backward movement of the engine 32. In such a state, the front shaft 37a pushes the center bearing 67 toward the rear, and therefore the impact force from the front to the rear acts on the center bearing 67. If the impact force is too large, the center bearing 67 receiving the impact force is detached from the bearing bracket 68. Thus, the rear wheel propeller shaft 37 and the center bearing 67 are detached from the fifth cross-member 15.

Referring to FIG. 24, the rear differential gear unit 38 includes an axle housing 132 accommodating a differential gear etc. The axle housing 132 includes a gear accommodation part 132a accommodating the differential gear, a left drive shaft accommodation part 132b extending in the vehicle width direction and accommodating a left rear wheel drive shaft configured to drive the left rear wheel 7, a right drive shaft accommodation part 132c extending in the vehicle width direction and accommodating a right rear wheel drive shaft configured to drive the right rear wheel 7, and an input shaft accommodation part 132d connected to the rear shaft 37b and accommodating the input shaft extending in the vehicle length direction. Each of the drive shaft accommodation parts 132b, 132c is in a cylindrical shape so as to cover the periphery of the rear wheel drive shaft. One of the drive shaft accommodation parts 132b, 132c extends toward one side of the gear accommodation part 132a in the vehicle width direction, and the other one of the drive shaft accommodation parts 132b, 132c extends toward the other side of the gear accommodation part 132a in the vehicle width direction.

Each of the drive shaft accommodation parts 132b, 132c is supported by a leaf spring 71 attached to a rear part of the wide part 10b of the main frame 10 (see FIG. 14). A shock absorber 72 is arranged between the left drive shaft accommodation part 132b and part of the left main frame 10 on the rear side relative to the left drive shaft accommodation part 132b, and another shock absorber 72 is arranged between the right drive shaft accommodation part 132c and part of the right main frame 10 on the front side relative to the right drive shaft accommodation part 132c (see FIGS. 13, 14, and 24).

An exhaust device 75 of the engine 32 is arranged at the right of the engine 32 (see FIGS. 13 and 24). The exhaust device 75 includes an exhaust pipe 76 extending to the vicinity of a rear end of the vehicle 1. An upstream exhaust purification device 77, a flexible joint 78, a downstream exhaust purification device 79, and a muffler 80 are, in this order from an upstream side, attached to the exhaust pipe 76. Each of the upstream and downstream exhaust purification devices 77, 79 has a three-way catalyst, and purifies exhaust from the engine 32. Particularly in order to purify HC and CO from the engine 32 which is in a cold state, the upstream exhaust purification device 77 is arranged near the engine 32. The flexible joint 78 is configured to reduce transmission of vibration of the engine 32 to part of the exhaust pipe 76 downstream of the flexible joint 78. The muffler 80 is arranged at the right of the rear shaft 37b of the rear wheel propeller shaft 37 between the fifth and sixth cross-members 15, 16.

The fuel tank 83 made of resin and storing fuel to be supplied to the engine 32 is arranged at the left of the rear shaft 37b (see FIGS. 13, 14, and 24). The fuel tank 83 is basically positioned between the fifth and sixth cross-members 15, 16. Part of the fuel tank 83 positioned between the fifth and sixth cross-members 15, 16 is hereinafter referred to as a "tank body 83a." A front extension 83b extending toward the front beyond the fifth cross-member 15 and arranged next to the center bearing 67 in the vehicle width direction is provided in the front of the tank body 83a. A rear extension 83c extending toward the rear beyond the sixth cross-member 16 is provided in the rear of the tank body 83a. The fuel tank 83 is narrowed in the vehicle width direction at a boundary between the tank body 83a and the front extension 83b and a boundary between the tank body 83a and the rear extension 83c. The fuel tank 83 is, at the foregoing two narrow parts, attached and fixed to lower surfaces of the fifth and sixth cross-members 15, 16 through band-shaped tank attachment members 84 (see FIG. 24). Although not shown in the figure, an insulator which is a thin steel plate for blocking heat from the exhaust pipe 76 and the muffler 80 is provided on a right side surface of the fuel tank 83. In addition, an under guard which is a thin steel plate is provided on a lower surface of the fuel tank 83. Such an under guard is also provided in the following positions: a position below the engine 32; a position between the first and second cross-members; and a position below the power transfer unit 34.

The right and left front wheels 6 are steered by a steering mechanism operated in synchronization with a steering wheel operated by a passenger. In the steering mechanism, a pinion is rotated by operating the steering wheel, and a rack engaged with the pinion is accommodated in a steering gear box 87 (see FIGS. 13 and 15-18). The rack extends in the vehicle width direction, and is, at both ends thereof, attached to right and left steering rods 88 (see FIGS. 16 and 18). Each of the steering rods 88 is connected to a knuckle 91 provided in an inner part of the hub 50 in the vehicle width direction.

Referring to FIGS. 15-20, the right and left front wheels 6 are supported respectively by right and left front wheel suspension devices 90 (indicated by a reference number "90" only in FIG. 15). Each of the front wheel suspension devices 90 is a high mount type double wishbone suspension. Each of the front wheel suspension devices 90 includes the knuckle 91, a lower arm 92, an upper arm 93, a coil spring 94 (illustrated only in FIG. 20), and a shock absorber 95. Note that a stabilizer provided in the front wheel suspension device 90 is not shown in the figure.

The lower arm 92 is in such a shape that the lower arm 92 is branched into two front and rear parts in a base end part thereof (inner part thereof in the vehicle width direction). A front base end part 92a of the lower arm 92 is attached to the second cross-member 12 through the cross-member bracket 23, and a rear base end part 92b of the lower arm 92 is attached to the third cross-member 13 through the cross-member bracket 24. Specifically, the front base end part 92a is rotatably attached to a lower arm pivot 98 (see FIGS. 6 and 22) which is provided so as to extend in the vehicle length direction in the cross-member bracket 23, and the rear base end part 92b is rotatably attached to a lower arm pivot 99 (see FIGS. 6 and 22) which is provided so as to extend in the vehicle length direction in the cross-member bracket 24. This allows the lower arm 92 to vertically swing about the lower arm pivots 98, 99.

The upper arm 93 is in such a shape that the upper arm 93 is branched into two front and rear parts in a base end part thereof. A front base end part 93a of the upper arm 93 is rotatably attached to one end part of an upper arm pivot 106 (see FIGS. 15-17 and 19) which is provided so as to extend in the vehicle length direction in an inner panel 102 of a suspension tower 101 which will be described later, and a rear base end part 93b of the upper arm 93 is rotatably attached to the other end part of the upper arm pivot 106. This allows the upper arm 93 to vertically swing about the upper arm pivot 106.

The lower arm 92 outwardly extends from the front and rear base end parts 92a, 92b in the vehicle width direction relative to the main frame 10. The lower arm 92 is, in a tip end part thereof (outer end part thereof in the vehicle width direction), connected to a lower end part of the knuckle 91 through a ball joint 110 (see FIGS. 19 and 22). The upper arm 93 outwardly extends from the front and rear base end parts 93a, 93b in the vehicle width direction relative to the main frame 10. The upper arm 93 is, in a tip end part thereof (outer end part thereof in the vehicle width direction), connected to an upper end part of an arm part 91a upwardly extending toward an upper part of the knuckle 91 through a ball joint 111 (see FIGS. 15, 17, and 19). Thus, the knuckle 91, the lower arm 92, and the upper arm 93 vertically swing in synchronization with the vertical movement of the front wheel 6.

A bump stopper 115 (see FIGS. 2-6, 15, 17, and 19-23) is welded to an outer surface of the main frame 10 in the vehicle width direction. The bump stopper 115 is configured to contact a contact part 92c provided near the rear base end part 92b on an upper surface of the lower arm 92 and restrict upward movement of the lower arm 92 beyond a position where the bump stopper 115 and the contact part 92c contact each other. The lower arm 92 is formed by two upper and lower plate members 92d, 92e (a space is formed between the plate members 92d, 92e), and another plate member 92f is welded to the contact part 92c in order to increase the strength of the contact part 92c (see FIG. 22).

Each of the bump stoppers 115 includes a stopper body 116 attached to the outer surface of the main frame 10 in the vehicle width direction so as to outwardly protrude in the vehicle width direction. The stopper body 116 is a panel which is formed in a bag shape (in the present embodiment, a substantially U-shape) opening on the inner side in the vehicle width direction as viewed in a cross section along the horizontal direction and which opens at both of upper and lower ends. End parts of the panel at sides of the opening on the inner side in the vehicle width direction (end parts of the U-shape as viewed in the cross section), i.e., a front attachment part 116c and a rear attachment part 116d (see FIGS. 6, 22, and 23) of the stopper body 116, are attached to the outer surface of the main frame 10 in the vehicle width direction with the end parts of the panel being apart from each other in the vehicle length direction. That is, the stopper body 116 is attached to the main frame 10 at the end parts of the U-shape as viewed in the cross section (at the front and rear attachment parts 116c, 116d).

The opening of the stopper body 116 at the upper end of the panel is hereinafter referred to as an "upper opening 116a," and the opening of the stopper body 116 at the lower end of the panel is hereinafter referred to as a "lower opening 116b." Since the stopper body 116 is attached to the main frame 10 at the front and rear attachment parts 116c, 116d, the opening of the panel on the inner side in the vehicle width direction is closed, and the stopper body 116 and part of the main frame 10 together form a vertically-extending cylindrical shape which opens at both of upper and lower ends in the vertical direction. The openings at the upper and lower ends in the vertical direction are the upper opening 116a and the lower opening 116b, respectively. Thus, it can be said that the upper opening 116a is formed between an upper end part of the stopper body 116 and the outer surface of the main frame 10 in the vehicle width direction. In addition, it can be said that the lower opening 116b is formed between a lower end part of the stopper body 116 and the outer surface of the main frame 10 (specifically the cross-member bracket 24) in the vehicle width direction.

In the present embodiment, the amount of outward protrusion of the stopper body 116 from the main frame 10 in the vehicle width direction is gradually increased toward the bottom of the stopper body 116. Thus, as viewed in the vehicle length direction, a tip end of the stopper body 116 is downwardly inclined toward the outer side in the vehicle width direction. An opening area of the lower opening 116b is larger than that of the upper opening 116a.

Of the upper opening 116a and the lower opening 116b, only the lower opening 116b is covered by a closing member 117 (see FIGS. 4, 6, 22, and 23). A contact member 118 contacting the lower arm 92 is attached to an outer part of a lower surface of the closing member 117 in the vehicle width direction. Specifically, referring to FIG. 23, the contact member 118 includes an inverted dish-shaped base 118a fixed to the closing member 117, and a rubber contact part 118b vulcanized and bonded to the base 118a and formed in a downwardly-pointing conical shape. The contact part 92c of the lower arm 92 contacts the rubber contact part 118b. A stud bolt 119 is welded to a center part of the base 118a so as to upwardly protrude, and a weld nut 120 into which the stud bolt 119 is screwed is welded to an upper surface of the closing member 117. A through-hole 117a is formed in a position of the closing member 117 corresponding to the weld nut 120 (see FIGS. 6 and 23). When the contact member 118 is attached to the lower surface of the closing member 117, the stud bolt 119 is inserted into the through-hole 117a, and then the base 118a is rotated. In such a manner, the stud bolt 119 is screwed into the weld nut 120.

The rear attachment part 116d of the stopper body 116 is, in a position where the rear attachment part 116d and the third cross-member 13 overlap with each other in the vehicle length direction, attached to a part extending from an upper end to a lower end in the outer surface of the main frame 10 in the vehicle width direction and to the third cross-member 13 (specifically the cross-member bracket 24). In addition, the front attachment part 116c of the stopper body 116 is, in a position between the engine mount bracket 27 and the third cross-member 13 in the vehicle length direction, attached to a part extending from the upper end to the lower end in the outer surface of the main frame 10 in the vehicle width direction.

The lower arm 92 is, in the vicinity of the rear base end part 92b (part of the lower arm 92 contacting the contact member 118), forwardly inclined toward the outer side in the vehicle width direction. Thus, in accordance with such a shape, the stopper body 116 and the contact member 118 protrude from the outer surface of the main frame 10 in the vehicle width direction toward the outer side in the vehicle width direction in the state in which the stopper body 116 and the contact member 118 are forwardly inclined toward the outer side in the vehicle width direction.

The configuration and arrangement of the bump stopper 115 allows the bump stopper 115 to be easily crushed in the vehicle length direction upon the frontal collision of the vehicle 1. Thus, the bump stopper 115 does not prevent the crushing (compression deformation) of the main frame 10 in the vehicle length direction upon the frontal collision of the vehicle. In the present embodiment, in positions (one of the positions is in an upper surface and the other position is in the lower surface) of the main frame 10 overlapping with the upper opening 116a in the vehicle length direction, a plurality of recessed parts 125 (two recessed parts 125) (see FIGS. 4, 7, 8, 15, and 20) are respectively formed (the recessed part formed in the lower surface of the main frame 10 is not shown in the figure). The plurality of recessed parts 125 allow the main frame 10 to be more easily crushed in the vehicle length direction. In addition, since the front attachment part 116c of the stopper body 116 of the bump stopper 115 does not overlap with the engine mount bracket 27 in the vehicle length direction, advantages similar to those in an later-described arrangement in which a plurality of deformation preventing members are dispersively arranged can be realized. The recessed parts 125 may be formed in any positions of the main frame 10 as long as such positions overlap with the upper opening 116a in the vehicle length direction. The recessed parts 125 are not necessarily formed respectively in multiple positions, and the recessed part 125 may be formed only in a single position. Even if a small hole penetrating the inner panel 20 or the outer panel 21 is formed instead of forming the recessed part 125, it is expected that the similar advantages can be realized. In such a case, the small hole functions as a hole which is required for taking an electrodeposition solution in and out of the closed space of the main frame 10 at a step of coating the main frame.

The suspension tower 101 configured to support a top part of a vertically-extending strut 96 (i.e., the coil spring 94 and the shock absorber 95) of the front wheel suspension device 90 is attached to part of the narrow part 10a of the main frame 10 between the second and third cross-members 12, 13 (see, e.g., FIGS. 6-8, 10-12, 15-17, and 19). A lower end part of the strut 96 (lower end part of the shock absorber 95) is connected to the lower arm 92 so as to rotate about an axis extending in the vehicle length direction.

Figure 10:
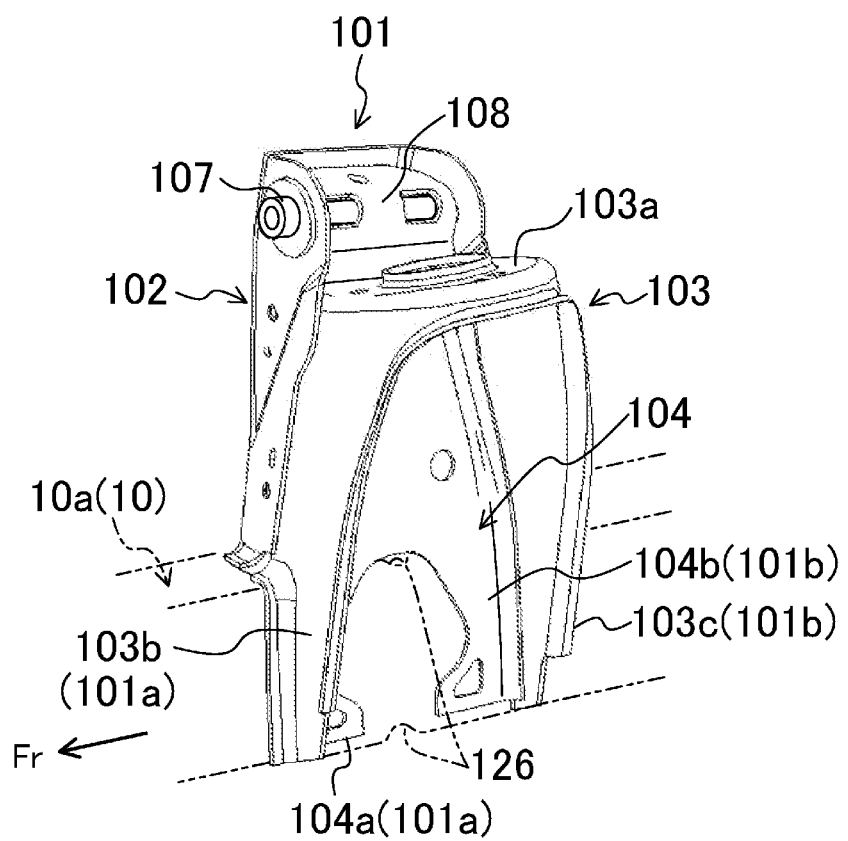
FIG. 10 is a perspective view illustrating the suspension tower of the left main frame.
Figure 11:
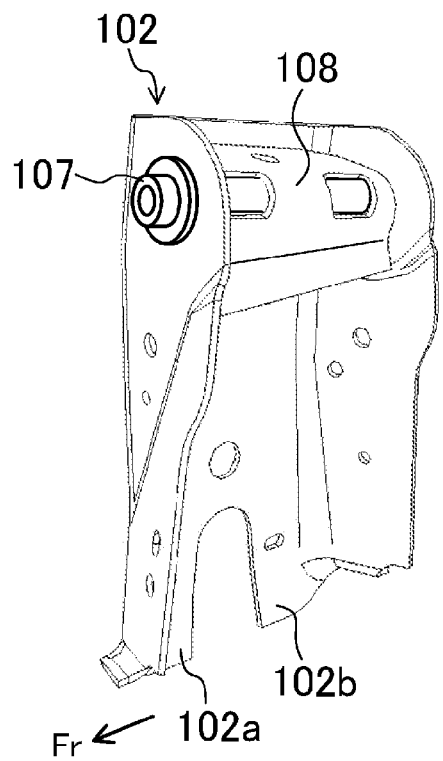
FIG. 11 is a perspective view illustrating an inner panel and a stiffener of the suspension tower illustrated in FIG. 10.
Figure 12:
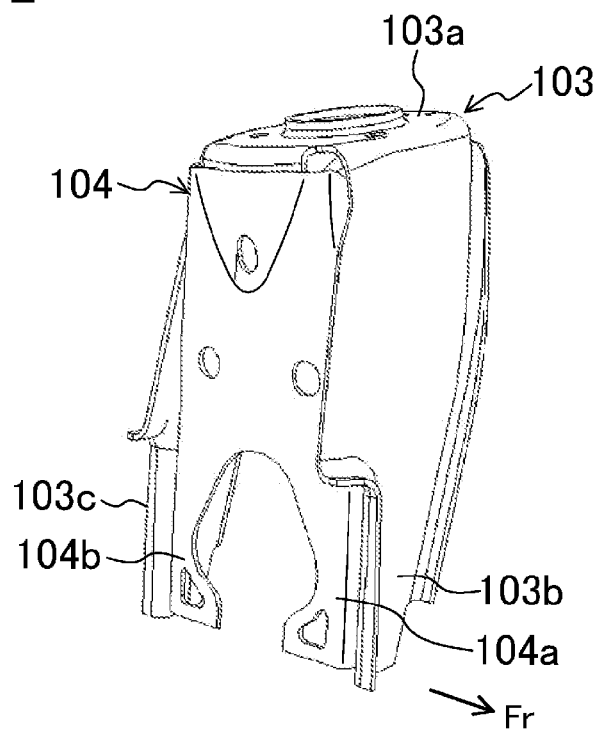
FIG. 12 is a perspective view illustrating an outer panel and a suspension tower reinforcement of the suspension tower illustrated in FIG. 10.

The suspension tower 101 includes the inner panel 102 positioned on the inner side in the vehicle width direction, an outer panel 103 connected to the inner panel 102 and positioned on the outer side in the vehicle width direction, and a suspension tower reinforcement 104 provided between the panels 102, 103 (see, e.g., FIGS. 10-12). In a lower part of the suspension tower 101, a front leg part 101a and a rear leg part 101b are provided so as to be branched and be separated from each other in the vehicle length direction.

Specifically, a strut receiving part 103a configured to support the top part of the strut 96 is formed in an upper end part of the outer panel 103. Top parts of the coil spring 94 and the shock absorber 95 are fixed to the strut receiving part 103a and are supported by the strut receiving part 103a. The outer panel 103 includes an outer panel front leg part 103b downwardly extending from an upper front end part of the outer panel 103, and an outer panel rear leg part 103c downwardly extending from an upper rear end part of the outer panel 103.

The suspension tower reinforcement 104 is welded to the outer panel 103 so as to cover an opening of the outer panel 103 between the outer panel front leg part 103b and the outer panel rear leg part 103c on the inner side in the vehicle width direction. A space surrounded by the outer panel front leg part 103b, the outer panel rear leg part 103c, and the suspension tower reinforcement 104 and opening on the outer side in the vehicle width direction is a space accommodating the strut 96. Note that, instead of providing the suspension tower reinforcement 104, the outer panel 103 may be integrally formed to fill a part corresponding to the suspension tower reinforcement 104.

The outer panel 103 to which the suspension tower reinforcement 104 is welded is welded to the inner panel 102. In such a welded state, a closed space is, as viewed in the cross section, formed between the inner panel 102 and the suspension tower reinforcement 104. If the outer panel 103 is integrally formed to fill the part corresponding to the suspension tower reinforcement 104, a closed space is, as viewed in the cross section, formed between the inner panel 102 and the outer panel 103.

In the foregoing welded state, the inner panel 102 upwardly protrudes relative to the outer panel 103, and the outer panel 103 downwardly protrudes relative to the inner panel 102. In the upwardly-protruding part of the inner panel 102, the upper arm pivot 106 configured to support the upper arm 93 is provided so as to extend in the vehicle length direction. The upper arm pivot 106 is inserted into a support sleeve 107 (see FIGS. 10 and 11) provided in the inner panel 102. A stiffener 108 (see FIGS. 10 and 11) is provided on an outer side of the support sleeve 107 in the vehicle width direction (in a position above the outer panel 103), and reinforces part of the inner panel 102 where the upper arm pivot 106 is provided. The reason why the upper arm pivot 106 is provided in the inner panel 102 is that the length of the upper arm 93 can be longer than that in the case where the upper arm pivot 106 is provided in the outer panel 103.

In a lower part of the inner panel 102, an inner panel front leg part 102a and an inner panel rear leg part 102b are provided so as to be branched and be separated from each other in the vehicle length direction. In the lower part of the suspension tower reinforcement 104, a reinforcement front leg part 104a and a reinforcement rear leg part 104b are provided so as to be branched and be separated from each other in the vehicle length direction. The reinforcement front leg part 104a is welded to the outer panel front leg part 103b, and the reinforcement rear leg part 104b is welded to the outer panel rear leg part 103c.

The inner panel front leg part 102a, the outer panel front leg part 103b, and the reinforcement front leg part 104a together form the front leg part 101a of the suspension tower 101. The inner panel rear leg part 102b, the outer panel rear leg part 103c, and the reinforcement rear leg part 104b together form the rear leg part 101b of the suspension tower 101.

The front leg part 101a and the rear leg part 101b of the suspension tower 101 are welded to the main frame 10 so as to be separated from each other in the vehicle length direction. Specifically, the inner panel front leg part 102a and the inner panel rear leg part 102b of the inner panel 102 are welded to an inner part of an upper surface of the main frame 10 in the vehicle width direction (to the inner panel 20 of the main frame 10) so as to be separated from each other in the vehicle length direction. The outer panel front leg part 103b and the outer panel rear leg part 103c of the outer panel 103 are welded to an outer part of the upper surface of the main frame 10 in the vehicle width direction and to a part extending from the upper end to the lower end in the outer surface of the main frame 10 in the vehicle width direction (to the outer panel 21 of the main frame 10) so as to be separated from each other in the vehicle length direction. The reinforcement front leg part 104a and the reinforcement rear leg part 104b of the suspension tower reinforcement 104 are welded to the outer surface of the main frame 10 in the vehicle width direction (to the outer panel 21 of the main frame 10) so as to be separated from each other in the vehicle length direction. Thus, the lower part of the suspension tower 101 is not attached to the main frame 10 across the entirety of the lower part of the suspension tower 101 in the vehicle length direction, but a middle lower part of the suspension tower 101 in the vehicle length direction is not attached to the main frame 10. As described above, even if the lower part of the suspension tower 101 is attached to the main frame 10 at the front leg part 101a and the rear leg part 101b, the suspension tower 101 is, on the inner side in the vehicle width direction, attached to the main frame 10 at the inner panel front leg part 102a and the inner panel rear leg part 102b, and is, on the outer side in the vehicle width direction, attached to the main frame 10 at the outer panel front leg part 103b, the outer panel rear leg part 103c, the reinforcement front leg part 104a, and the reinforcement rear leg part 104b. Thus, the attachment strength of the suspension tower 101 to the main frame 10 can sufficiently withstand force received from the strut 96.

A plurality of recessed parts 126 (four recessed parts 126) (see FIGS. 6-9 and 20-22) are formed in part of the main frame 10 between the front leg part 101a and the rear leg part 101b (in the total of four parts which are a corner part formed between the upper surface of the main frame 10 and one of side surfaces of the main frame 10, a corner part between the upper surface of the main frame 10 and the other side surface of the main frame 10, a corner part formed between the lower surface of the main frame 10 and one of the side surfaces of the main frame 10, and a corner part formed between the lower surface of the main frame 10 and the other side surface of the main frame 10). The plurality of recessed parts 126 allow the main frame 10 to be easily crushed in the vehicle length direction at the recessed parts 126 upon the frontal collision of the vehicle 1 (particularly upon a full-wrap frontal collision of the vehicle 1). That is, a connection part of the main frame 10 and the suspension tower 101 (attachment part of the main frame 10 and the suspension tower 101) is typically less likely to be crushed. However, since the suspension tower 101 is attached to the main frame 10 at the front leg part 101a and the rear leg part 101b branched to be separated from each other in the vehicle length direction, the main frame 10 can be, at part thereof between the front leg part 101a and the rear leg part 101b, easily crushed in the vehicle length direction upon the frontal collision of the vehicle 1. In addition, since the recessed parts 126 are formed in the foregoing part, the main frame 10 can be more easily crushed in the vehicle length direction at the foregoing part. Note that the recessed parts 126 may be formed in any part of the main frame 10 between the front leg part 101a and the rear leg part 101b. The recessed parts 126 are not necessarily formed respectively in multiple positions, and the recessed part 126 may be formed in a single position.

The second cross-member 12 is provided in a position apart from the suspension tower 101 toward the front. In addition, the third cross-member 13 is provided in a position apart from the suspension tower 101 toward the rear.

The engine mount bracket 27 is provided so as to be, in the vehicle length direction, apart from the connection part of the main frame 10 and the suspension tower 101, a connection part of the main frame 10 and the second cross-member 12 (connection part of the main frame 10 and the cross-member bracket 23), and a connection part of the main frame 10 and the third cross-member 13 (connection part of the main frame 10 and the cross-member bracket 24). In addition, the engine mount bracket 27 is welded to part of the inner surface of the main frame 10 in the vehicle width direction (to part of the inner panel 20 of the main frame 10) between the second and third cross-members 12, 13.

Providing the engine mount bracket 27 apart from each of the foregoing connection parts in the vehicle length direction includes providing the engine mount bracket 27 apart from each of the foregoing connection parts in the vehicle length direction at the same height position of the main frame 10. Referring to, e.g., FIG. 9, the engine mount bracket 27 is forwardly inclined toward the bottom at a front end thereof. At a height position in the upper part of the main frame 10, an upper front end part of the engine mount bracket 27 is positioned apart from the rear leg part 101b of the suspension tower 101 in the vehicle length direction. A lower front end part of the engine mount bracket 27 is positioned apart from the rear leg part 101b in the vertical direction. That is, the engine mount bracket 27 is, at the front end thereof, forwardly inclined toward the bottom such that a clearance having a predetermined width is formed between the engine mount bracket 27 and the suspension tower 101 (rear leg part 101b). As will be described later, the main frame 10 is, at the foregoing clearance, compressed and deformed in the vehicle length direction.

In the present embodiment, the engine mount bracket 27 is attached to part of the main frame 10 between the suspension tower 101 and the third cross-member 13. In such a case, since the engine 32 can be arranged in a position relatively closer to the rear in a front part of the main frame 10, timing of backward movement of the engine 32 upon the front collision of the vehicle 1 can be delayed. As a result, the amount of energy absorbed by the compression deformation of the front part of the main frame 10 before the engine 32 begins to move backward can be increased.

The engine mount bracket 27 may be attached to part of the main frame 10 between the suspension tower 101 and the second cross-member 12. In such a case, it is also preferred that the engine mount bracket 27 is attached to the main frame 10 so as to be apart from the connection part of the main frame 10 and the suspension tower 101, the connection part of the main frame 10 and the second cross-member 12, and the connection part of the main frame 10 and the third cross-member 13 in the vehicle length direction. Note, however, that the engine 32 is likely to be arranged in a position relatively closer to the front in the front part of the main frame 10, and therefore the timing of the backward movement of the engine 32 upon the frontal collision of the vehicle 1 is advanced. As a result, the amount of energy absorbed by the crushing of the main frame 10 before the engine 32 begins to move backward is decreased. Thus, engineering for energy absorption is required, which takes into account the backward movement of the engine 32 having an unstable behavior.

Upon the frontal collision of the vehicle 1, one or both of the main frames 10 are crushed in the vehicle length direction from the front end thereof toward the rear. In part of the main frame 10 between the second and third cross-members 12, 13, the various deformation preventing member preventing the crushing (compression deformation) of the main frame 10 in the vehicle length direction upon the frontal collision of the vehicle 1, such as the second and third cross-members 12, 13, the suspension tower 101, and the engine mount bracket 27, are attached. Since the bump stopper 115 is, as described above, formed in such a shape that the bump stopper 115 is easily crushed, the bump stopper 115 is not considered as the deformation preventing member.

In such a case, if the plurality of deformation preventing members are arranged so as to overlap with each other in the vehicle length direction, the main frame 10 is much less likely to be crushed at the attachment parts of the plurality of deformation preventing members and the main frame 10. Thus, the plurality of deformation preventing members are dispersively arranged in the vehicle length direction on the main frame 10, and therefore it is ensured that the main frame 10 is crushed at part of the main frame 10 between adjacent ones of the deformation preventing members. Unlike the case where the plurality of deformation preventing members are arranged so as to overlap with each other in the vehicle length direction, the main frame 10 does not compressed and deformed at all in the vehicle length direction at the attachment part of each of the deformation preventing members and the main frame 10 (particularly the attachment part of each of the suspension tower 101 and the engine mount bracket 27 and the main frame 10), but it is highly likely that the main frame 10 is compressed and deformed in the vehicle length direction. Thus, due to the total compression deformation at multiple positions, the amount of collision energy absorbed upon the frontal collision of the vehicle 1 can be ensured.

A method for attaching the gear unit 36 to the chassis frame 9 on a manufacturing line of the vehicle 1 will be described with reference to FIGS. 25-31. Note that, in FIGS. 25-31, the main frame 10, the second cross-member 12, the third cross-member 13, the gear unit 36, etc. are drawn in a simplified shape (the same applies to FIGS. 32 and 33).

Figure 25:
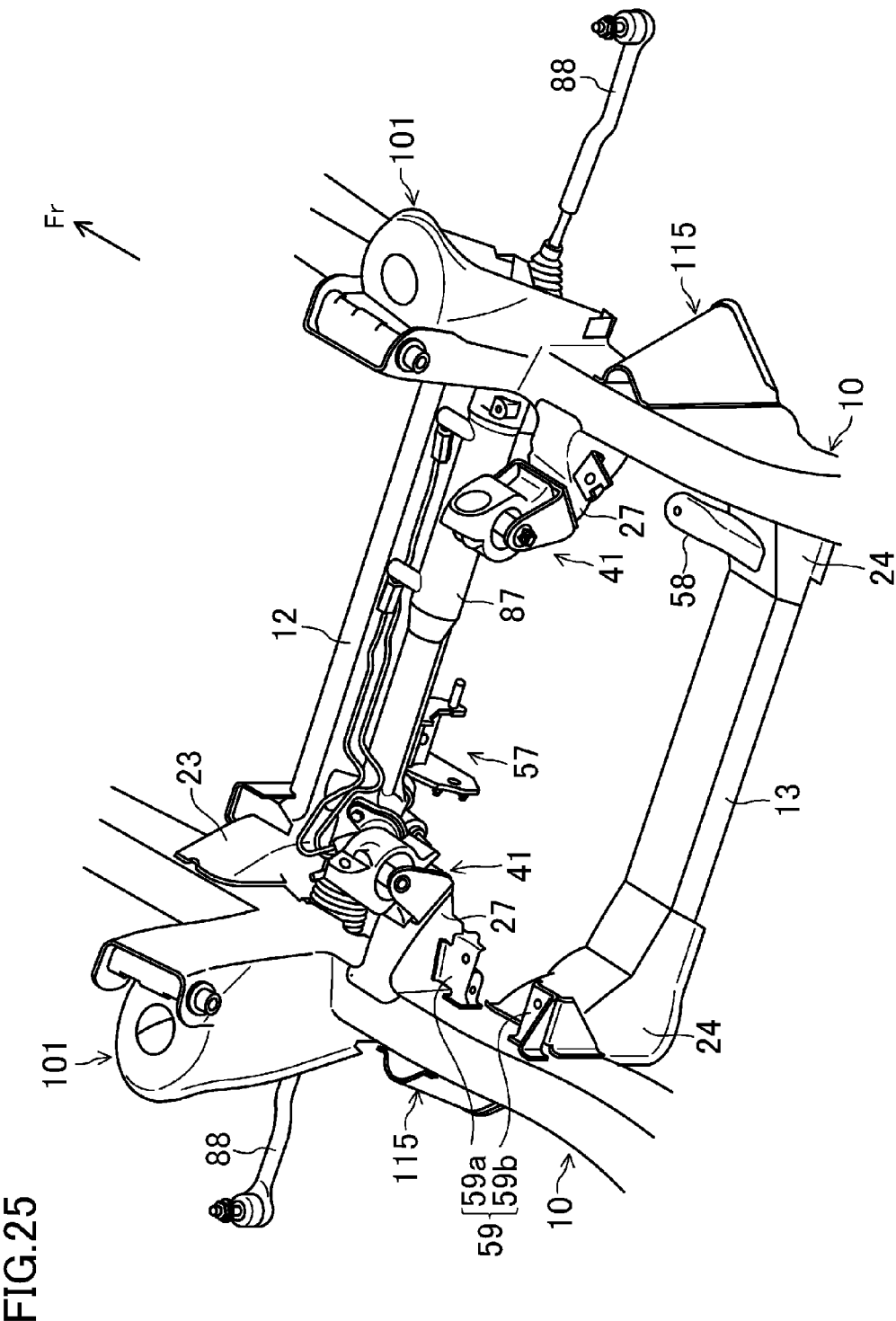
FIG. 25 is a perspective view illustrating a main part of the chassis frame before a front differential gear unit is attached.

Referring to FIG. 25, before the attachment of the gear unit 36, the engine mount 41 is attached to the engine mount bracket 27 attached to each of the main frames 10 of the chassis frame 9, and a unit including the steering gear box 87 and the steering rod 88 of the steering mechanism is attached to the second cross-member 12. Note that the rubber bushes 53a, 54a are, in advance, attached respectively to the first and second mount holding parts 131e, 131f of the gear unit 36 (the central shafts 53b, 54b are not attached respectively to the rubber bushes 53a, 54a). The rubber bush 55a is, in advance, attached to the third mount holding part 131g, and the central shaft 55b is attached to the rubber bush 55a.

The chassis frame 9 moves down the manufacturing line to an attachment area of the gear unit 36. In the attachment area, the gear unit 36 is suspended by a suspending device 210 (illustrated only in FIGS. 26 and 27). The suspending device 210 includes a single suspending wire 211 extending in the vertical direction, and a suspending section 220 suspended at a lower end of the suspending wire 211 and configured to hold the gear unit 36. The suspending wire 211 is vertically movable by a user's operation of a remote controller switch. By the operation of the remote controller switch, the height position of the suspending section 220, i.e., the height position of the gear unit 36 can be adjusted. In addition, the user can manually move the gear unit 36 in the horizontal direction.

A ring 212 is fixed to the lower end of the suspending wire 211, and a horizontally-extending cantilever rod 220a is provided in an upper part of the suspending section 220. A tip end of the cantilever rod 220a is inserted into the ring 212, and therefore the suspending wire 211 suspends the gear unit 36 through the suspending section 220. In such a configuration, the user can vertically swing the gear unit 36 suspended by the suspending wire 211 about the lower end of the suspending wire 211 such that, e.g., a front side of the gear unit 36 moves relative to a rear side thereof.

Figure 26:
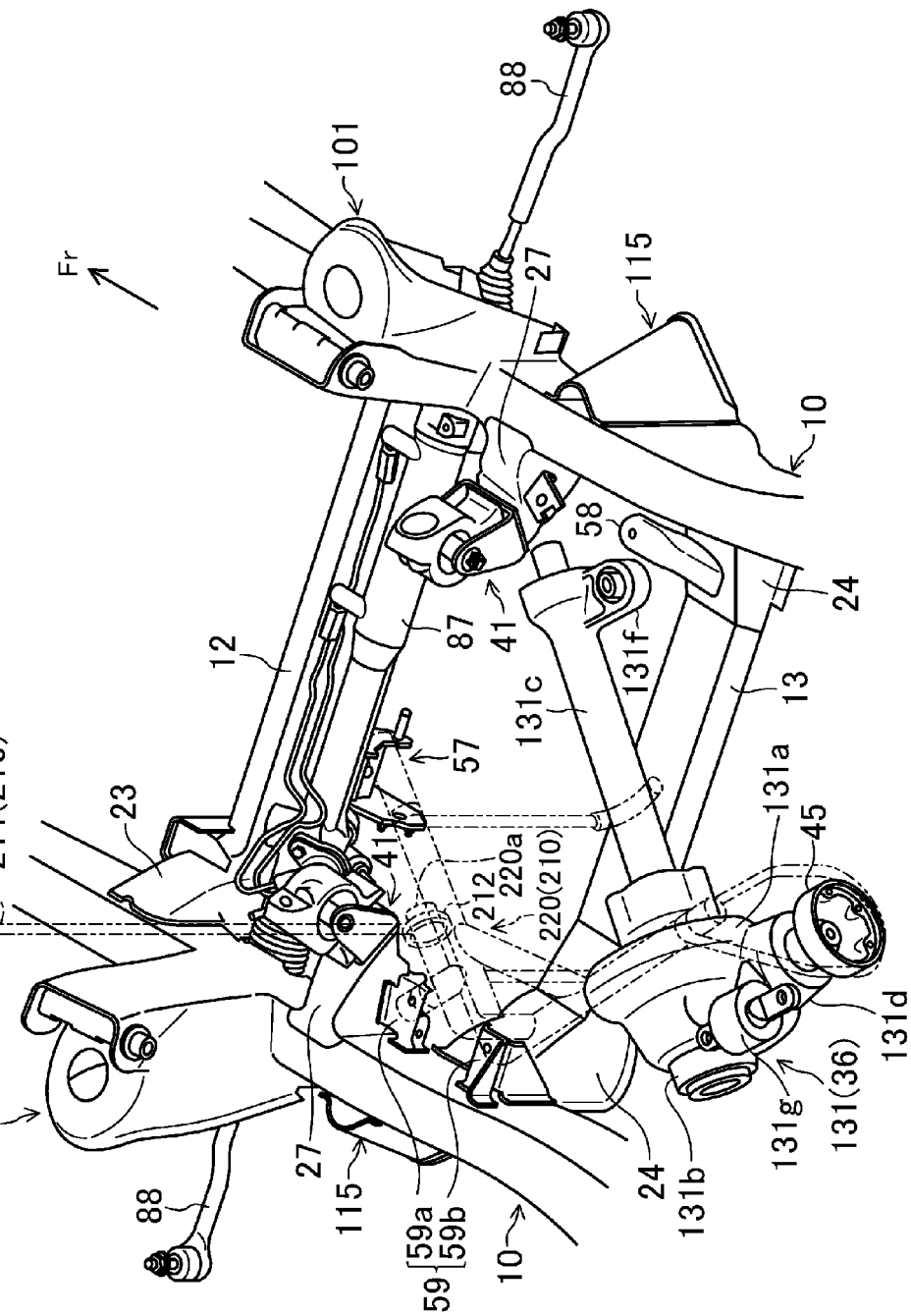
FIG. 26 corresponds to FIG. 25, and is a view illustrating a step for attaching the front differential gear unit.
Figure 27:
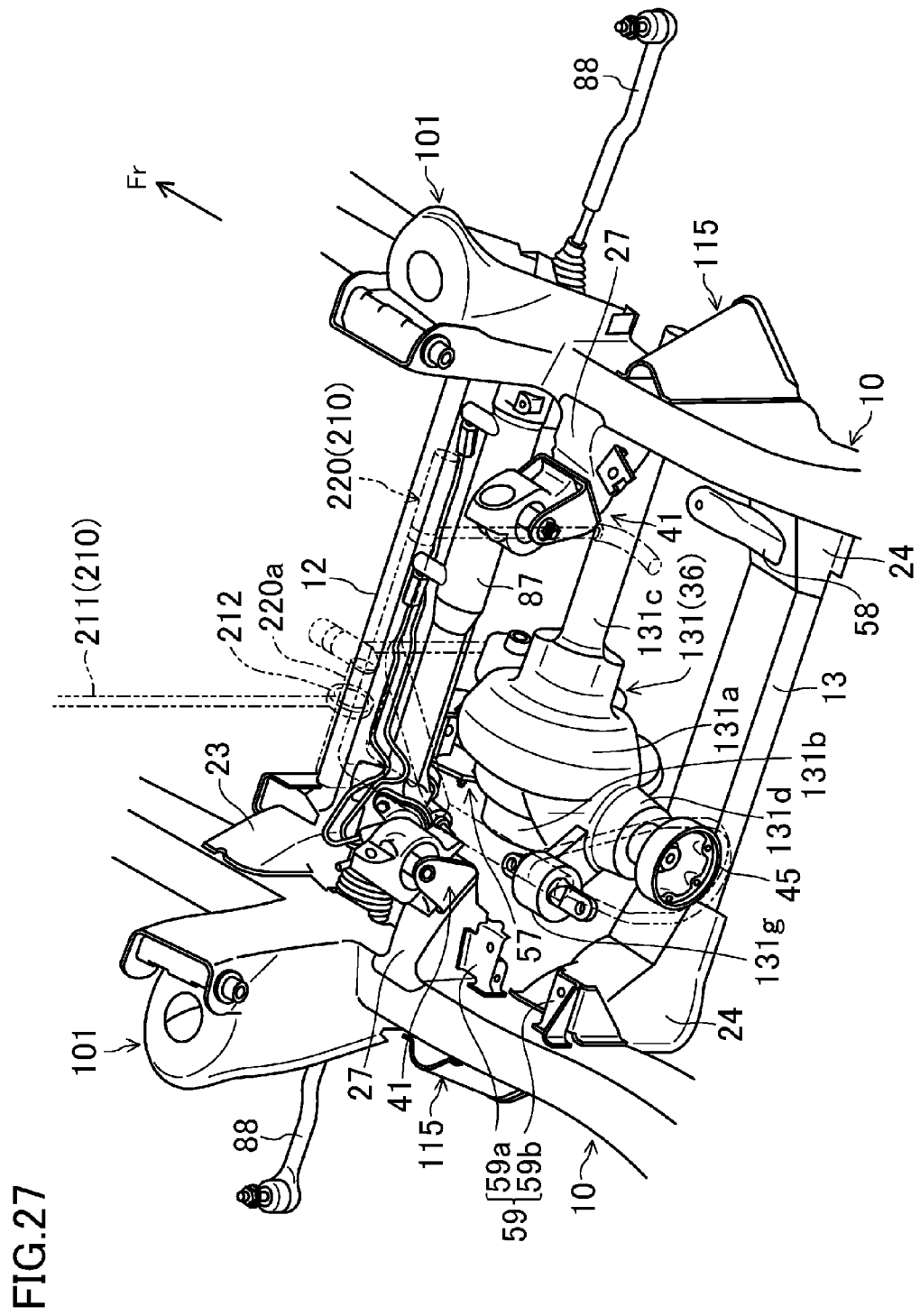
FIG. 27 corresponds to FIG. 25, and is a view illustrating another step for attaching the front differential gear unit.

Referring to FIG. 26, upon the attachment of the gear unit 36, the user first moves the gear unit 36 from the rear of the third cross-member 13 toward the front. In such a state, the gear unit 36 is in an attitude that the right output shaft accommodation part 131c of the case 131 is inclined forward toward the right.

Subsequently, a tip end part of the right output shaft accommodation part 131c passes below the right engine mount bracket 27 and the right main frame 10, and then the gear unit 36 is positioned closer to the right. In such a state, while the gear unit 36 is, as viewed in the plane, rotated clockwise about a virtual vertical axis passing the vicinity of the tip end of the right output shaft accommodation part 131c, the gear accommodation part 131a, the left output shaft accommodation part 131b, etc. pass above the third cross-member 13 to be positioned in the front of the third cross-member 13. At this point, the gear accommodation part 131a, the left output shaft accommodation part 131b, etc. are moved so as not to contact the left engine mount bracket 27 and the left engine mount 41. Then, the gear accommodation part 131a etc. are positioned in the front of the third cross-member 13, and the right output shaft accommodation part 131c is in the state in which the right output shaft accommodation part 131c extends in the vehicle width direction (see FIG. 27). In such a state, the first mount 53 (rubber bush 53a) is positioned closer to the center of the vehicle 1 in the width direction thereof (to the inner side in the vehicle width direction) relative to the first mount bracket 57. As described above, the gear unit 36 is moved such that the first mount 53 is positioned closer to the center of the vehicle 1 in the width direction thereof relative to the first mount bracket 57.

Next, in the state in which the first mount 53 (rubber bush 53a) is positioned closer to the center of the vehicle 1 in the width direction thereof relative to the first mount bracket 57, the gear unit 36 is moved to the front left, and then the left output shaft accommodation part 131b passes below the left engine mount bracket 27. Such movement is continued until the first mount 53 (rubber bush 53a) comes into contact with the outer plate 57c (equivalent to the first fixing part). That is, referring to FIG. 28, the surface of the rubber bush 53a attached to the first mount holding part 131e in advance, on the outer side in the vehicle width direction comes into contact with the surface of the outer plate 57c on the inner side in the vehicle width direction. At this point, the rubber bush 54a is mounted on the upper surface of the second mount bracket 58, and both of the end parts of the central shaft 55b are mounted respectively on upper surfaces of the front divided part 59a and the rear divided part 59b of the third mount bracket 59.

Fine adjustment to align the center part (center hole) of the rubber bush 53a with the shaft insertion hole 57h is easier by using the swinging of the gear unit 36 about the lower end of the suspending wire 211 as compared to fine adjustment by vertically moving the suspending wire 211 by the operation of the remote controller switch. In such a case, in order to swing the gear unit 36, the rubber bush 54a is preferably spaced from the upper surface of the second mount bracket 58. Similarly, both of the end parts of the central shaft 55b are preferably spaced from the upper surfaces of the front divided part 59a and the rear divided part 59b. Thus, the fine adjustment is preferably performed in the state in which the rubber bush 54a is slightly spaced from the upper surface of the second mount bracket 58, and both of the end parts of the central shaft 55b are slightly spaced from the upper surfaces of the front divided part 59a and the rear divided part 59b. In such a case, after the central shaft 53b is, as will be described later, inserted into the shaft insertion hole 57g, the center part (center hole) of the rubber bush 53a, and the shaft insertion hole 57h in this order and before the external thread part of the central shaft 53b and the nut 182 are fastened together, the rubber bush 54a is mounted on the upper surface of the second mount bracket 58, and both of the end parts of the central shaft 55b are mounted respectively on the front divided part 59a and the rear divided part 59b of the third mount bracket 59. After the mounting, the suspending section 220 is detached from the gear unit 36. Thus, the operation of the remote controller switch is not necessary, and a subsequent operation is facilitated.

Subsequently, after the inner plate 57b (equivalent to the second fixing part) is attached and fixed to the plate attachment member 57d with the stud bolts 180 and the nuts 181, the central shaft 53b is, from the inner side in the vehicle width direction, inserted into the shaft insertion hole 57g, the center part (center hole) of the rubber bush 53a, and the shaft insertion hole 57h in this order. Then, the nut 182 is fastened to the external thread part of the central shaft 53b (see FIG. 29). In such a manner, the first mount 53 (rubber bush 53a) contacting the outer plate 57c is supported so as to be sandwiched between the outer plate 57c and the inner plate 57b in the vehicle width direction. Thus, the first mount 53 is attached to the first mount bracket 57 such that the central shaft 53b extends in the vehicle width direction.

The fastening of the central shaft 53b allows the contact between the surface of the rubber bush 53a on the outer side in the vehicle width direction and the surface of the outer plate 57c on the inner side in the vehicle width direction, and the contact between the surface of the inner plate 57b on the outer side in the vehicle width direction and the surface of the rubber bush 53a on the inner side in the vehicle width direction. Thus, the rubber bush 53a is sandwiched between the inner and outer plates 57b, 57c positioned respectively on both sides of the rubber bush 53a in the vehicle width direction. The central shaft 53b is fixed to the inner and outer plates 57b, 57c with the central shaft 53b penetrating the center part (center hole) of the rubber bush 53a in the vehicle width direction. The sandwiching of the rubber bush 53a allows the first mount 53 to be supported with the first mount 53 being positioned relative to the first mount bracket 57 in the vehicle width direction. In addition, the fitting of the central shaft 53b into the center part (center hole) of the rubber bush 53a and the shaft insertion holes 57g, 57h allows the first mount 53 to be supported with the first mount 53 being positioned relative to the first mount bracket 57 in the vehicle length direction and the vertical direction. Thus, the entirety of the gear unit 36 is substantially positioned in the vehicle width direction, the vehicle length direction, and the vertical direction, thereby facilitating subsequent attachment of the second and third mounts 54, 55. However, due to the deformation of the rubber bush 53a, the second mount holding part 131f widely separated from the first mount holding part 131e is movable to some extent in the vehicle length direction and the vertical direction relative to the first mount holding part 131e, and the third mount holding part 131g is movable to some extent in the vertical direction relative to the first mount holding part 131e. Thus, in a strict sense, it cannot be said that the entirety of the gear unit 36 is positioned relative to the chassis frame 9 in the vehicle width direction, the vehicle length direction, and the vertical direction.

Figure 30:
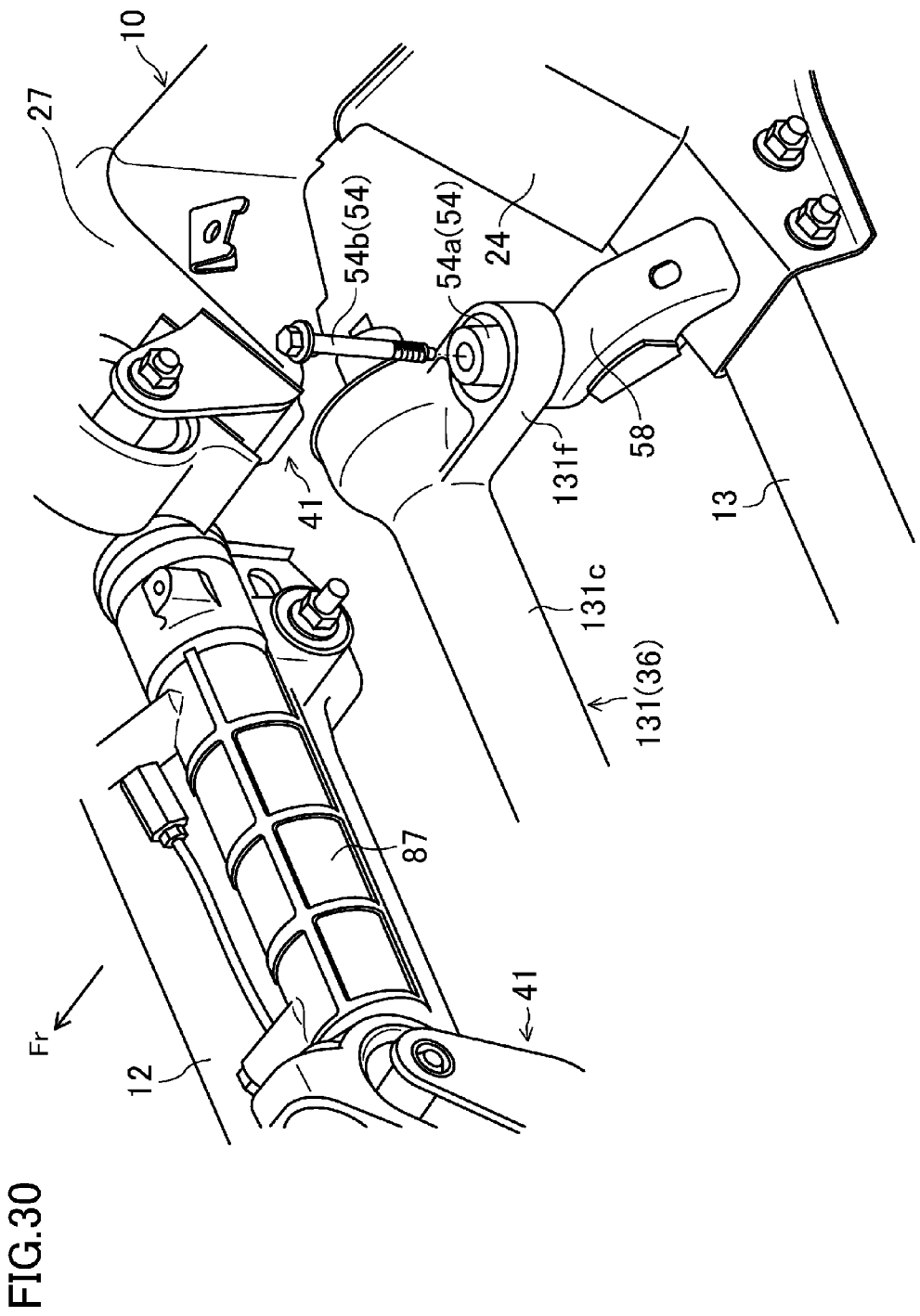
FIG. 30 is a perspective view of the vicinity of a second mount bracket illustrating the state in which a second mount is being attached to the second mount bracket.

Next, referring to FIG. 30, the central shaft 54b is, from above the rubber bush 54a, inserted into the center part (center hole) of the rubber bush 54a mounted on the upper surface of the second mount bracket 58, and the external thread part of the central shaft 54b at the lower end thereof is fastened to the internal thread part of the weld nut provided on the lower surface of the second mount bracket 58. Such fastening allows the central shaft 54b to be fixed to the second mount bracket 58 in the state in which the central shaft 54b penetrates, in the vertical direction, the center part (center hole) of the rubber bush 54a mounted on the upper surface of the second mount bracket 58. The center hole of the rubber bush 54a may be in a hole shape elongated in the vehicle width direction. In such a case, even if a relative position between the first mount 53 and the second mount 54 in the vehicle width direction and a relative position between the first mount bracket 57 and the second mount bracket 58 in the vehicle width direction are displaced from each other due to the tolerance of each component, the center hole formed in the elongated hole shape absorbs such displacement.

As in the foregoing, the second mount 54 is attached to the second mount bracket 58 such that the central shaft 54b of the second mount 54 extends in the vertical direction. This allows the second mount 54 to be supported in the state in which the second mount 54 is positioned relative to the second mount bracket 58 in the vehicle length direction and the vertical direction. As a result, the entirety of the gear unit 36 is positioned relative to the chassis frame 9 in the vehicle width direction, the vehicle length direction, and the vertical direction.

Figure 31:
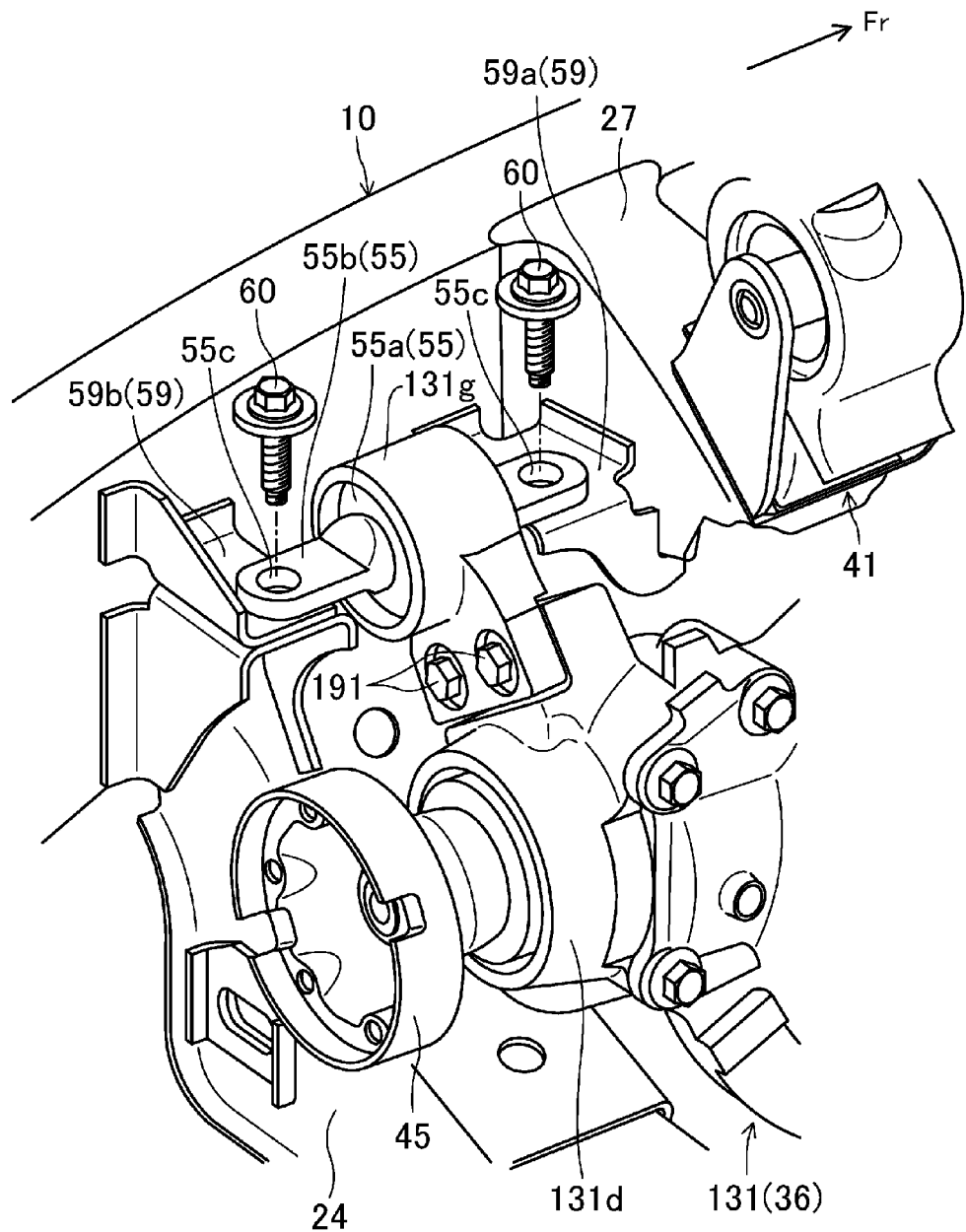
FIG. 31 is a perspective view of the vicinity of a third mount bracket illustrating the state in which a third mount is being attached to the third mount bracket.

Finally, referring to FIG. 31, both of the end parts of the central shaft 55b mounted respectively on the upper surfaces of the front divided part 59a and the rear divided part 59b of the third mount bracket 59 are fixed respectively to the front divided part 59a and the rear divided part 59b. That is, a bolt insertion hole 55c (see FIG. 31) is formed in each of the end parts of the central shaft 55b. A through-hole is formed in a position of each of the front divided part 59a and the rear divided part 59b below the bolt insertion hole 55c. The bolt 60 is, from above, inserted into the bolt insertion hole 55c and the through-hole, and the bolt 60 and the nut 61 are fastened together below each of the front divided part 59a and the rear divided part 59b. Thus, both of end parts of the central shaft 55b are fixed in the state in which the end parts of the central shaft 55b are mounted respectively on the upper surfaces of the front divided part 59a and the rear divided part 59b. In the foregoing manner, the central shafts 55b are supported by the third mount bracket 59 so as to extend in the vehicle length direction. The rubber bush 55a is supported by the third mount bracket 59 through the central shaft 55b, and does not contact the third mount bracket 59 (i.e., the front divided part 59a and the rear divided part 59b). As described above, the third mount 55 is attached to the third mount bracket 59 such that the central shaft 55b of the third mount 55 extends in the vehicle length direction.

The positions of the bolt insertion hole 55c are substantially determined by the fastening of the central shaft 53b and the central shaft 54b. The third mount 55 is not necessarily positioned relative to the third mount bracket 59 in the vehicle width direction and the vehicle length direction by the bolt insertion holes 55c and the bolts 60, and the inner diameter of the bolt insertion hole 55c is formed to be relatively larger than the outer diameter of the bolt 60 so that the third mount 55 is fixed at the position determined by the fastening of the central shaft 53b and the central shaft 54b. Thus, even if the center of the bolt insertion hole 55c is coincident with the center of the bolt 60, the central shaft 55b can be fastened and fixed to the third mount bracket 59. Consequently, even in the case where, after the first mount 53 and the second mount 54 are fixed respectively to the first mount bracket 57 and the second mount bracket 58, displacement of the position of the third mount 55 in the horizontal direction occurs due to the tolerance of each component and torsion of the rubber bushes 53a, 54a, 55a, since the inner diameter of the bolt insertion hole 55c is larger than the outer diameter of the bolt 60, such position displacement is absorbed. The fastening of the bolt 60 and the nut 61 allows the third mount 55 to be positioned relative to the third mount bracket 59 only in the vertical direction.

As in the foregoing, the attachment of the gear unit 36 to the chassis frame 9 is completed.

According to the foregoing attachment method, the gear unit 36 can be, from above the chassis frame 9, attached to the chassis frame 9 without turning the chassis frame 9 upside down, and a single user can easily perform the attachment by using the suspending section 220 suspended by the suspending wire 211.

Since the central shafts 53b, 54b, 55b of the first to third mounts 53-55 extend in the directions different from each other in the state in which the gear unit 36 is attached, vibration components generated in the gear unit 36 in any directions (i.e., three axes) can be received in a radial direction in which each of the rubber bushes 53a, 54a, 55a is capable of absorbing vibration. Thus, the vibration components are less likely to be transmitted to the chassis frame 9.

A most part of the weight of the gear unit 36 can be supported by the first mount 53 held by the first mount holding part 131e provided in the front part of the gear accommodation part 131a having the largest weight among the components of the gear unit 36 and by the third mount 55 held by the third mount holding part 131g provided in the input shaft accommodation part 131d (i.e., positioned at the rear of the gear accommodation part 131a), and the entirety of the gear unit 36 can be supported with balance by the first and third mounts 53, 55 and the second mount 54 positioned farthest from the gear accommodation part 131a. That is, a support structure is employed, in which the weight of the gear unit 36 is supported in the vicinity of the front and rear sides of the axis passing the gravity center of the gear unit 36 (i.e., at the first and third mounts 53, 55) and the gear unit 36 is, at the remaining part (second mount 54), prevented from swinging about the axis extending in the vehicle longitudinal direction.

Since the gear accommodation part 131a is part where the largest vibration occurs, the support structure of the first and third mounts 53, 55 is important to reduction in vibration transmission to the chassis frame 9. The first and third mount holding parts 131e, 131g are likely to vibrate particularly in the vertical direction due to rotation of the differential gear. Typically, the rubber bush easily functions to attenuate vibration in the radial direction thereof. Thus, the central shaft of one of the first and third mounts 53, 55 may extend in the vehicle width direction, and the central shaft of the other one of the first and third mounts 53, 55 may extend in the vehicle length direction. Since it is considered that the first mount 53 attenuates, as compared to the third mount 55, larger vibration and supports a larger weight, the rubber bush 53a of the first mount 53 is preferably provided along the vehicle width direction in the front of the gear accommodation part 131a so that the front part of the gear accommodation part 131a can be uniformly supported by the entirety of the rubber bush 53a. Thus, the first mount 53 is attached to the first mount bracket 57 such that the central shaft 53b of the first mount 53 extends in the vehicle width direction, and the third mount 55 is attached to the third mount bracket 59 such that the central shaft 55b of the third mount 55 extends in the vehicle length direction.

Since the first mount 53 is first attached with the first mount 53 being positioned relative to the first mount bracket 57, the first mount 53 can be arranged without distortion in order to effectively absorb vertical vibration of the first mount holding part 131e in which vibration particularly in the vertical direction is large.

In the second mount holding part 131f, large vibration in the vehicle longitudinal direction relative to the gear accommodation part 131a is likely to occur. Thus, the second mount 54 is attached to the second mount bracket 58 such that the central shaft 54b of the second mount 54 extends in the vertical direction.

As a result, vibration occurred in the gear unit 36 can be effectively attenuated by the rubber bushes 53a, 54a, 55a of the first to third mounts 53-55, thereby effectively reducing the vibration transmission to the chassis frame 9.

Next, detachment of the gear unit 36 upon a service after sale of the vehicle 1, such as the case where, e.g., the differential gear of the gear unit 36 is broken down and the gear unit 36 is replaced, will be described.

Upon the service, the gear unit 36 is preferably replaced without detaching the engine 32 etc. Thus, in the present embodiment, the gear unit 36 can be detached toward below the chassis frame 9.

Specifically, the third mount holding part 131g is configured to be detachable from the input shaft accommodation part 131d. That is, referring to FIG. 31, the input shaft accommodation part 131d is fixed from the rear with two bolts 191.

Upon the service, the bolts 191 are detached, and the central shaft 55b of the third mount 55 (i.e., the third mount holding part 131g) is maintained fixed to the third mount bracket 59. In addition to the detachment of the bolts 191, the inner plate 57b, the central shaft 53b, and the central shaft 54b are detached. This allows the gear unit 36 (except the third mount holding part 131g) to be freely movable relative to the chassis frame 9.

Subsequently, referring to FIG. 32, the gear unit 36 is rotated about a virtual axis passing a rear part of the gear unit 36 (i.e., the vicinity of the constant velocity joint 45) and extending in the vehicle width direction, and a front part of the gear unit 36 (i.e., the first mount holding part 131e) is downwardly moved. By the rotation of the gear unit 36, the second mount holding part 131f and the constant velocity joint 45 is upwardly moved, and can be downwardly moved through the front of the second mount bracket 58.

When an upper part of the gear accommodation part 131a reaches the substantially same height position as that of the lower surface of the second cross-member 12 by the rotation of the gear unit 36, the entirety of the gear unit 36 is, referring to FIG. 33, moved obliquely downward toward the front. At this point, the gear unit 36 is moved such that the front part of the gear unit 36 does not contact the second cross-member 12 and the cross-member bracket 23 and the rear part of the gear unit 36 does not contact the third cross-member 13 and the cross-member bracket 24. In the foregoing manner, the gear unit 36 can be detached toward below the chassis frame 9. Note that another gear unit 36 (which does not include the third mount holding part 131g) may be attached by performing the steps for the detachment of the gear unit 36 in a retrograde order.

The present invention is not limited to the foregoing embodiment, and replacements can be made without departing from the main features of the invention.

The foregoing embodiment has been set forth merely for purposes of preferred examples in nature, and the scope of the invention is not limited to such an embodiment. The scope of the present invention is defined by the appended claims, and modifications and changes within the equivalent range of the claims are regarded to be within the scope of the present invention.

INDUSTRIAL APPLICABILITY

The present invention is useful for the 4WD vehicle (particularly a small truck or a SUV) including the chassis frame and the front differential gear unit.

DESCRIPTION OF REFERENCE CHARACTERS

1 Vehicle
9 Chassis Frame (Vehicle Frame)
10 Main Frame
12 Second Cross-Member
13 Third Cross-Member
36 Front Differential Gear Unit
53 First Mount (Mount Part) (First Mount Part)
53a Rubber Bush
53b Central Shaft (Fixing Part Fastening Bolt)
54 Second Mount (Second Mount Part)
54a Rubber Bush
54b Central Shaft
55 Third Mount (Third Mount Part)
55a Rubber Bush
55b Central Shaft
57 First Mount Bracket (Support Mount Bracket)
57b Inner Plate (Fixing Part on Side Closer to Center of Vehicle in Width Direction Thereof) (Second Fixing Part) (Fixing Part on Side Farther from Left Main Frame)
57c Outer Plate (Fixing Part on Side Farther from Center of Vehicle in Width Direction Thereof) (First Fixing Part) (Fixing Part on Side Closer to Left Main Frame)
57d Plate Attachment Member (Attachment Part) (Base Part)
57e Connection Plate (Base Part)
57i Recess
58 Second Mount Bracket
59 Third Mount Bracket
180 Stud Bolt (Fixing Part Fastening Bolt)
182 Nut (Nut to Be Screwed onto Mount Part Fastening Bolt)

The invention claimed is:

1. A support mount bracket which is provided on a vehicle frame including a pair of right and left main frames extending in a vehicle length direction and a cross-member connecting the main frames, to support a mount part of a front differential gear unit, and which is arranged on part of the cross-member which is, in a vehicle width direction, displaced from a center of a vehicle in the vehicle width, the support mount bracket comprising:
   a base part to be connected to the cross-member; and
   a pair of fixing parts protruding from the base part and sandwiching the mount part from sides of the mount part in the vehicle width direction,
   wherein one of the fixing parts on a side closer to the center of the vehicle in the vehicle width direction is detachably attached to the base part.

2. The support mount bracket of claim 1, wherein
   each of the fixing parts is a plate-shaped member,
   the base part includes an attachment part configured to detachably attach and fix a detachable fixing part and protruding from the cross-member toward the detachable fixing part, and
   a first hole into which a fixing part fastening bolt configured to fasten the detachable fixing part to the attachment part is inserted, and a second hole into which a mount part fastening bolt penetrating the mount part in parallel to the fixing part fastening bolt and configured to fasten the mount part to the fixing parts is inserted are formed in the detachable fixing part.

3. The support mount bracket of claim 2, wherein
one of the fixing parts on a side farther from the center of the vehicle in the vehicle width direction is integrally formed with the base part.

4. The support mount bracket of claim 2, wherein
the fixing part fastening bolt stands on the attachment part so as to extend toward the center of the vehicle in the vehicle width direction, and
a nut to be screwed onto the mount part fastening bolt is attached to one of the fixing parts on a side farther from the center of the vehicle in the vehicle width direction in a state in which rotation of the nut is stopped.

5. The support mount bracket of claim 4, wherein
in a tip end part of a protrusion of the attachment part, a recess is, as viewed in the vehicle width direction, formed to avoid an overlap with an outer shape of the mount part supported by the support mount bracket.

6. The support mount bracket of claim 5, wherein
two fixing part fastening bolts stand apart from each other on the attachment part, and
the recess is positioned between the two fixing part fastening bolts.

7. The support mount bracket of claim 1, wherein
engine mount brackets protruding respectively from the main frames toward the center of the vehicle in the vehicle width direction are provided at rear of the cross-member,
part of the front differential gear unit is positioned in a region surrounded by the engine mount brackets and the cross-member,
the mount part is provided in a front part of the front differential gear unit, and
the support mount bracket is provided in a rear part of the cross-member.

8. A method for mounting a front differential gear unit on a vehicle frame, the method comprising:
moving the front differential gear unit such that a first mount part provided in a front part of the front differential gear unit is positioned closer to a center of a vehicle in a vehicle width direction relative to a first mount bracket provided in a position of the vehicle frame which is, in the vehicle width direction, displaced from the center of the vehicle in the vehicle width direction and configured to support the first mount;
in a state in which the first mount is positioned closer to the center of the vehicle in the vehicle width direction relative to the first mount bracket, moving the front differential gear unit until the first mount part contacts a first fixing part provided in the first mount bracket; and
supporting, by attaching a second fixing part to the first mount bracket, the first mount part contacting the first fixing part so as to sandwich the first mount part between the first and second fixing parts in the vehicle width direction.

9. The method of claim 8, further comprising:
after the supporting the first mount part so as to sandwich the first mount part between the first and second fixing parts in the vehicle width direction, supporting a second mount part provided at one end of the front differential gear unit in the vehicle width direction by a second mount bracket provided on the vehicle frame; and
after the supporting the second mount part by the second mount bracket, supporting a third mount part provided at the other end of the front differential gear unit in the vehicle width direction by a third mount bracket provided on the vehicle frame.

10. An attachment structure of a front differential gear unit to a vehicle frame including a pair of right and left main frames extending in a vehicle length direction, and a cross-member connecting the main frames, the structure comprising:
a first mount bracket attached to a vicinity of one of the main frames in a rear part of the cross-member and configured to support a first mount part provided in a front part of the front differential gear unit,
wherein the first mount bracket includes
a base part connected to the cross-member, and
a pair of fixing parts protruding from the base part and configured to support the mount part so as to sandwich the mount part from sides thereof in a vehicle width direction, and
one of the fixing parts on a side farther from the one of the main frames is detachably attached to the base part.

11. The structure of claim 10, wherein
each of the fixing parts is a plate-shaped member,
the first mount part includes a cylindrical rubber bush and a central shaft penetrating a center part of the rubber bush,
the rubber bush of the first mount part is sandwiched between the fixing parts, and
the central shaft of the first mount part is fixed to the fixing parts in a state in which the central shaft penetrates the center part of the rubber bush in the vehicle width direction.

12. The structure of claim 11, wherein
the base part of the first mount bracket includes an attachment part configured to detachably attach and fix a detachable fixing part and protruding from the cross-member toward the detachable fixing part.

13. The structure of claim 12, wherein
one of the fixing parts on a side closer to the one of the main frames is integrally formed with the base part.

14. The structure of claim 10, in which second and third mount parts are provided respectively at ends of the front differential gear unit in the vehicle width direction, each of the first to third mount parts includes a cylindrical rubber bush and a central shaft penetrating a center part of the rubber bush, and the vehicle frame further includes, at rear of the cross-member, another cross-member connecting the main frames, the structure further comprising:
a second mount bracket attached to the another cross-member in vicinity of other main frame and configured to support the second mount part; and
a third mount bracket attached to the one of the main frames and configured to support the third mount part,
wherein the first mount part is attached to the first mount bracket such that the central shaft of the first mount part extends in the vehicle width direction,
the second mount part is attached to the second mount bracket such that the central shaft of the second mount part extends in a vertical direction, and
the third mount part is attached to the third mount bracket such that the central shaft of the third mount part extends in the vehicle length direction.

15. The structure of claim 14, wherein
the first mount part is attached to the first mount bracket in a state in which the first mount part is positioned relative to the first mount bracket in the vehicle width direction, the vehicle length direction, and the vertical direction.

16. The structure of claim 15, wherein
the rubber bush of the second mount part is mounted on an upper surface of the second mount bracket,
the central shaft of the second mount part is fixed to the second mount bracket in a state in which the central shaft penetrates the center part of the rubber bush of the second mount part in the vertical direction,
the central shaft of the third mount part penetrates the rubber bush of the third mount part in the vehicle length direction, and end parts of the central shaft protrude respectively toward front and rear sides of the rubber bush, and
protruding end parts of the central shaft of the third mount part are fixed to the third mount bracket in a state in which the protruding end parts are mounted on an upper surface of the third mount bracket.

* * * * *